(12) United States Patent
Gao

(10) Patent No.: US 11,330,533 B2
(45) Date of Patent: May 10, 2022

(54) MONITORING METHOD, MONITORING DEVICE AND COMPUTER STORAGE MEDIUM

(71) Applicant: ZTE CORPORATION, Guangdong (CN)

(72) Inventor: Xiang Gao, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/266,644

(22) PCT Filed: Jul. 23, 2019

(86) PCT No.: PCT/CN2019/097324
§ 371 (c)(1),
(2) Date: Feb. 8, 2021

(87) PCT Pub. No.: WO2020/038174
PCT Pub. Date: Feb. 27, 2020

(65) Prior Publication Data
US 2021/0360542 A1    Nov. 18, 2021

(30) Foreign Application Priority Data

Aug. 22, 2018    (CN) .......................... 201810963245.2

(51) Int. Cl.
*H04W 4/029* (2018.01)
*H04W 52/32* (2009.01)
*H04W 4/40* (2018.01)
*H04W 52/24* (2009.01)
*H04W 64/00* (2009.01)

(52) U.S. Cl.
CPC ......... *H04W 52/322* (2013.01); *H04W 4/029* (2018.02); *H04W 4/40* (2018.02); *H04W 52/245* (2013.01); *H04W 64/00* (2013.01)

(58) Field of Classification Search
CPC ..... H04W 52/322; H04W 4/029; H04W 4/40; H04W 52/245; H04W 64/00
USPC .................................................. 455/522, 69
See application file for complete search history.

(56) References Cited

U.S. PATENT DOCUMENTS

| 8,939,056 | B1 * | 1/2015 | Neal, III | ................. | F42B 15/22 |
| | | | | | 89/1.51 |
| 9,703,295 | B1 * | 7/2017 | Neal, III | ................. | B64C 31/02 |
| 9,794,753 | B1 * | 10/2017 | Stitt | ........................ | G06F 21/31 |
| 11,117,046 | B1 * | 9/2021 | Denbigh | ............. | A63F 3/00261 |

(Continued)

FOREIGN PATENT DOCUMENTS

| CN | 105916119 A | * | 8/2016 | .............. | H04W 4/04 |
| CN | 106470464 A | | 3/2017 | | |
| CN | 106971607 A | * | 7/2017 | ............. | G08G 1/123 |

*Primary Examiner* — Hai V Nguyen

(57) ABSTRACT

Disclosed in the embodiments of the present invention is a monitoring method applied to a vehicle. The method includes: determining a movement state of the vehicle as a target movement state, and broadcasting a target broadcast control channel signal; and after receiving an access request reported by a mobile terminal on the basis of the target broadcast control channel signal, initiating a monitoring apparatus of the vehicle to monitor an environment in which the vehicle is located. Further disclosed in the embodiments of the present invention are a monitoring device and a computer storage medium.

14 Claims, 15 Drawing Sheets

(56) References Cited

U.S. PATENT DOCUMENTS

| | | |
|---|---|---|
| 11,263,582 B2 * | 3/2022 | Prabhakar ............ G06F 16/2365 |
| 2013/0245881 A1 | 9/2013 | Scarbrough |
| 2017/0303090 A1 * | 10/2017 | Stitt ...................... H04W 12/06 |
| 2020/0019931 A1 * | 1/2020 | Prabhakar ............. H04L 63/102 |

* cited by examiner

MONITORING METHOD, MONITORING DEVICE AND COMPUTER STORAGE MEDIUM

CROSS-REFERENCE TO RELATED APPLICATIONS

This application claims the priority of Chinese Patent Application CN 201810963245.2, entitled "Monitoring Method, Monitoring Device and Computer Storage Medium" and filed on Aug. 22, 2018, the entirety of which is incorporated herein by reference.

FIELD OF THE INVENTION

The present disclosure relates to the technical field of monitoring, and in particular, to a monitoring method, a monitoring device, and a computer storage medium.

BACKGROUND OF THE INVENTION

A monitoring device mounted on a vehicle is a device for recording relevant information such as images and sounds during traveling of the vehicle. After the monitoring device is mounted on the vehicle, video images and sounds during driving can be recorded, so that evidence can be provided under circumstances such as a traffic accident. However, when the vehicle is stopped, the monitoring device is normally turned off, so that situations outside the vehicle cannot be monitored continuously. In relevant technologies, an acceleration sensor has been used to trigger the monitoring device to be turned on to record a video after a vehicle is hit. However, due to reasons such as sensitivity limitation of the acceleration sensor, the monitoring device may be turned on at a later time and as a result the vehicle cannot be monitored and protected effectively.

SUMMARY OF THE INVENTION

In order to solve the technical problem in existing technologies, embodiments of the present disclosure provide a monitoring method, a monitoring device, and a computer storage medium which can monitor and protect a vehicle effectively.

In order to achieve the above aim, technical solutions of the embodiments of the present disclosure are implemented as follows.

According to a first aspect, an embodiment of the present disclosure provides a monitoring method applied to a vehicle. The method includes steps of:

determining a movement state of the vehicle as a target movement state, and broadcasting a target broadcast control channel signal; and initiating, after receiving an access request reported by a mobile terminal on the basis of the target broadcast control channel signal, a monitoring apparatus of the vehicle to monitor an environment in which the vehicle is located.

According to a second aspect, an embodiment of the present disclosure provides a monitoring device. The monitoring device includes: at least one monitoring apparatus, an antenna, a processor, and a memory for storing computer programs that can be run on the processor. The monitoring apparatus and the antenna are respectively connected to the processor. The processor is used for, when running the computer programs, executing steps of the monitoring method according to the first aspect. The antenna is used for broadcasting a target broadcast control channel signal according to a control instruction of the processor, and the monitoring apparatus is used for performing monitoring according to an initiation instruction of the processor.

According to a third aspect, an embodiment of the present disclosure provides a computer storage medium. The computer storage medium stores computer programs which, when executed by the processor, implement steps of the monitoring method according to the first aspect.

According to the monitoring method, the monitoring device, and the computer storage medium provided by the above mentioned embodiments, after a movement state of the vehicle is determined as a target movement state, a target broadcast control channel signal is broadcast, and after an access request reported by a mobile terminal on the basis of the target broadcast control channel signal, a monitoring apparatus of the vehicle is initiated to monitor an environment in which the vehicle is located. In this way, after a movement state of the vehicle is a target movement state, the vehicle broadcasts a target broadcast control channel signal, so that when a mobile terminal approaches, the vehicle can receive an access request reported by a mobile terminal on the basis of the target broadcast control channel signal. That is, if it is determined that a person is in a monitoring-triggered scope of the vehicle, the monitoring apparatus of the vehicle is initiated to monitor an environment in which the vehicle is located, so as to monitor and protect the vehicle effectively.

DETAILED DESCRIPTION OF THE EMBODIMENTS

The present disclosure is elaborated below with reference to the accompanying drawings in conjunction with specific embodiments. Unless otherwise defined, all technical terms and scientific terms used herein have meanings as same as those normally understood by those skilled in the technical field of the present disclosure. Herein, terms used in the description of the present disclosure are only for the purpose of describing specific embodiments, rather than for limiting the present disclosure. The wording of "and/or" includes any or all combinations of one or more relevant listed items.

Figure 1:
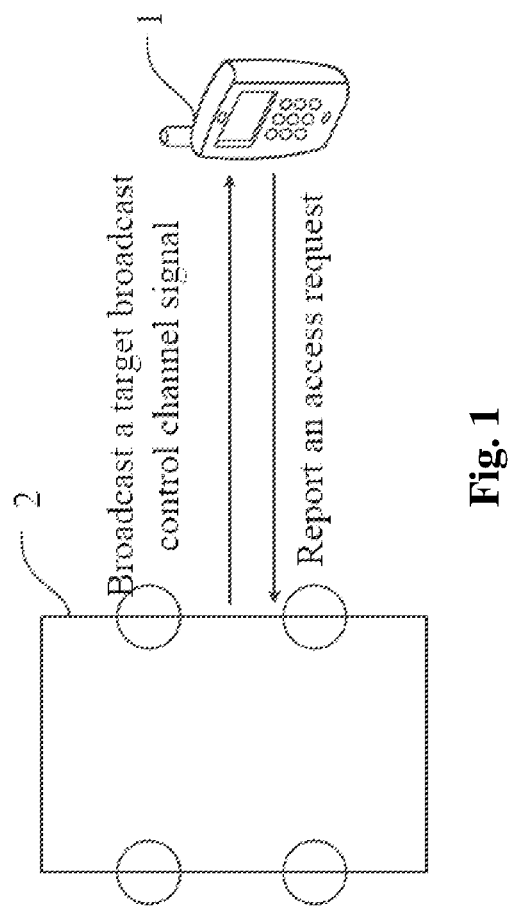
FIG. 1 schematically shows an application environment of a monitoring method according to an embodiment of the present disclosure.

FIG. 1 schematically shows an application environment of a monitoring method according to an embodiment of the present disclosure. The application environment includes a mobile terminal 1 and a vehicle 2. The mobile terminal 1 is a terminal that has a communication function and can get access to a base station according to a received broadcast control channel signal. The vehicle has an antenna that can broadcast a broadcast control channel signal and a monitoring apparatus that at least has a video-recording function. After a movement state of the vehicle 2 is a target movement state, the vehicle 2 broadcasts a target broadcast control channel signal. The mobile terminal 1 reports an access request on the basis of the target broadcast control channel signal. After receiving the access request reported by the mobile terminal 1, the vehicle 2 initiates the monitoring apparatus thereof to monitor an environment in which the vehicle is located. Herein, the vehicle 2 broadcasts the target broadcast control channel signal only after it is determined that the current time meets a preset time range and/or a current location meets a preset location condition. In this way, after a movement state of the vehicle 2 is a target movement state, the vehicle 2 broadcasts a target broadcast control channel signal, so that when the mobile terminal 1 approaches, the vehicle can receive an access request reported by the mobile terminal 1 on the basis of the target broadcast control channel signal. That is, if it is determined that a person is in a monitoring-triggered scope of the vehicle 2, the monitoring apparatus of the vehicle 2 is initiated to monitor the environment in which the vehicle 2 is located, so as to monitor and protect the vehicle 2 effectively. The mobile terminal 1 may be a terminal having a communication function, such as a smart phone, a watch phone, a tablet computer, and so on. The vehicle 2 may be a motor vehicle, and may also be a non-motor vehicle.

Figure 2:
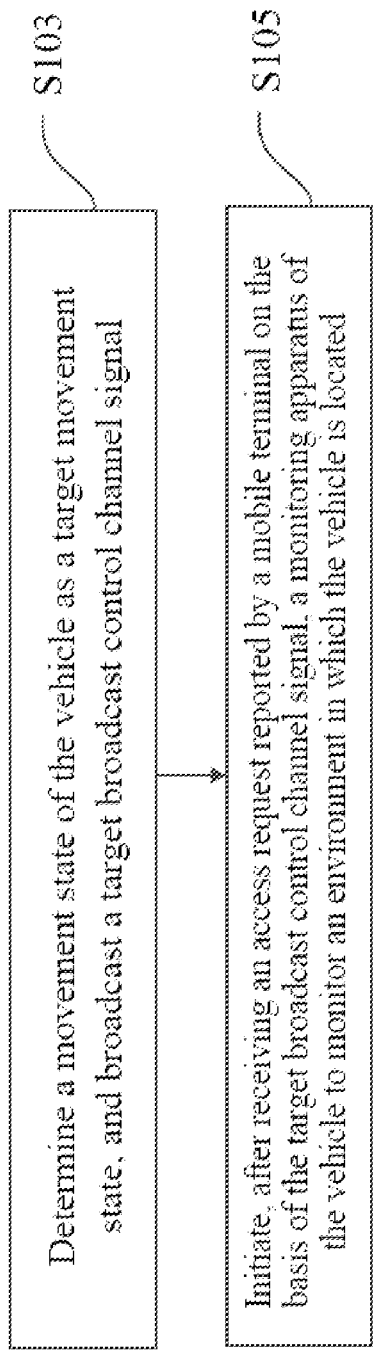
FIG. 2 schematically shows a flowchart of the monitoring method according to an embodiment of the present disclosure.

FIG. 2 is a monitoring method provided in an embodiment of the present disclosure, and the monitoring method is applied to the vehicle 2 in FIG. 1. The method includes the following steps.

At step S103, a movement state of the vehicle is determined as a target movement state, and a target broadcast control channel signal is broadcast.

In the present embodiment, the movement state of the vehicle being the target movement state refers to that the movement state of the vehicle is a vehicle-parked state. The vehicle-parked state refers to a state when the vehicle remains stationary after the engine of the vehicle stops operating. Generally, after the engine of a vehicle stops operating, a monitoring apparatus of the vehicle is also turned off. The monitoring apparatus of the vehicle refers to an apparatus having functions such as video-recording. The monitoring apparatus is for example an automobile data recorder, or a vehicle-mounted TBOX bonded with an automobile data recorder, and so on. The target broadcast control channel signal is broadcast by way of simulating a base station, so as to form a monitoring-triggered scope of the vehicle. The monitoring-triggered scope of the vehicle can be understood as a certain area around the vehicle in which the monitoring apparatus of the vehicle can be triggered to perform monitoring, and can also be understood as a coverage area corresponding to the target broadcast control channel signal.

At step S105, after the access request reported by the mobile terminal on the basis of the target broadcast control channel signal is received, the monitoring apparatus of the vehicle is initiated to monitor the environment in which the vehicle is located.

After entering the monitoring-triggered scope of the vehicle, i.e., receiving the target broadcast control channel signal, the mobile terminal reports the access request on the basis of the target broadcast control channel signal, so as to request to get access to a simulated base station corresponding to the target broadcast control channel signal. After it is determined that the access request reported by the mobile terminal is received, information about the environment around the vehicle including a person using the mobile phone may be acquired by initiating the monitoring apparatus of the vehicle to monitor and record a video of the environment in which the vehicle is located. In this way, the information can be used as monitoring data in circumstances for example where the vehicle is hit or stolen, and etc. The environment in which the vehicle is located refers to the environment around the current location of the vehicle, and may be understood as a regional scope that can be monitored by the monitoring apparatus of the vehicle. It can be understood by persons skilled in the art that there may be one or more monitoring apparatuses, and the monitoring apparatus may be disposed at any position of the vehicle.

In an exemplary embodiment, the monitoring apparatus includes a camera module. The monitoring apparatus may include at least one camera module that can rotate for 360 degrees, and a 360-degree environment of the vehicle may be monitored by the rotation of the camera module. The monitoring apparatus may also include two or more cameras reasonably disposed in the vehicle, and the cameras can monitor the 360-degree environment of the vehicle.

To sum up, in the monitoring method provided in the above embodiment, after the movement state of the vehicle is determined as the target movement state, a target broadcast control channel signal is broadcast; and after an access request reported by a mobile terminal on the basis of the target broadcast control channel signal, a monitoring apparatus of the vehicle is initiated to monitor an environment in which the vehicle is located. In this way, after a movement state of the vehicle is a target movement state, the vehicle broadcasts a target broadcast control channel signal, so that when the mobile terminal approaches, the vehicle can receive an access request reported by the mobile terminal on the basis of the target broadcast control channel signal. That is, if it is determined that a person is in a monitoring-triggered scope of the vehicle, the monitoring apparatus of the vehicle is initiated to monitor an environment in which the vehicle is located, so as to monitor and protect the vehicle effectively.

In an exemplary embodiment, the vehicle includes a transmitting antenna and a receiving antenna which is disposed at a set distance away from the transmitting antenna. The transmitting antenna is used for broadcasting the target broadcast control channel signal, and the receiving antenna is used for receiving the access request.

Herein, the transmitting antenna may be disposed at the front part of the vehicle, and the receiving antenna may be disposed at the rear part of the vehicle. The distance may be set according to factors such as the length of the vehicle, the monitoring-triggered scope of the vehicle, and so on. The distance may be set as 2 meters, or 3 meters, and so on. The transmitting antenna is used for broadcasting and sending the target broadcast control channel signal. The receiving antenna is used for receiving the target broadcast control channel signal sent by the transmitting antenna, so that the transmitting antenna adjusts the transmitting target broadcast control channel signal according the signal strength of the target broadcast control channel signal received by the receiving antenna, so as to realize adjusting the monitoring-triggered scope of the vehicle.

Figure 3:
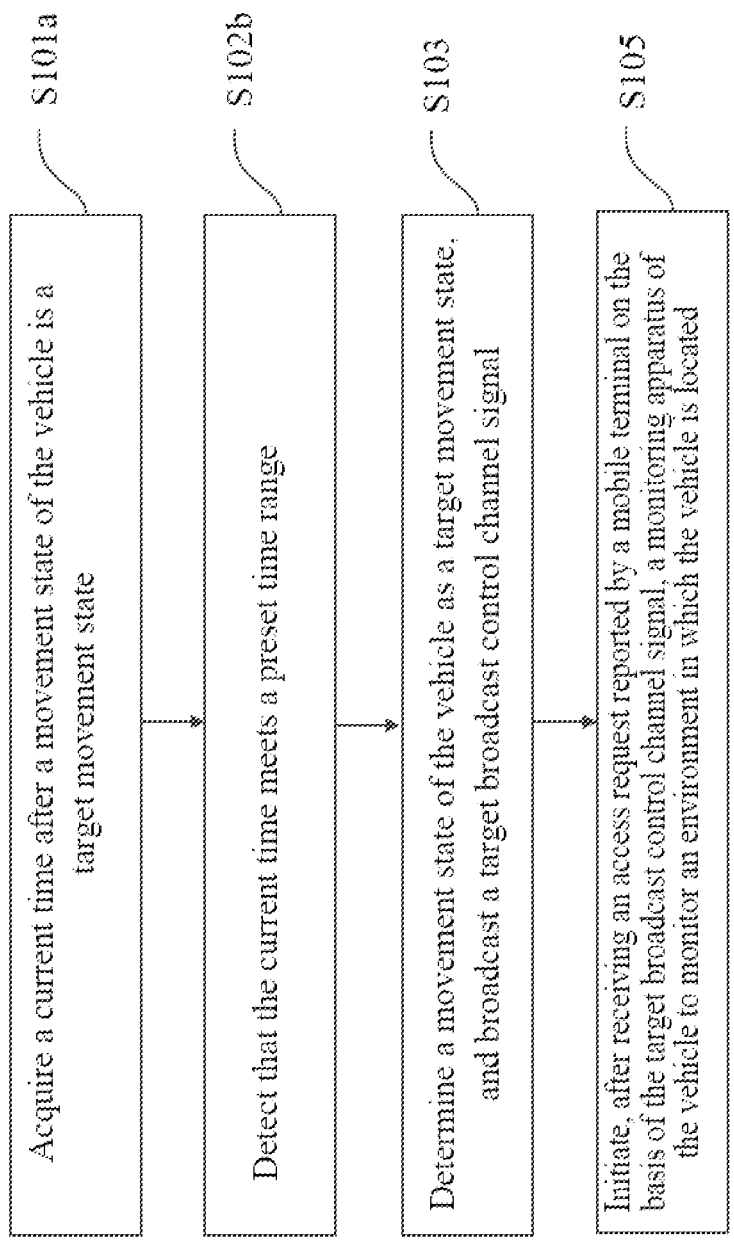
FIG. 3 schematically shows a flowchart of a monitoring method according to another embodiment of the present disclosure.

In an exemplary embodiment, as shown in FIG. 3, before the step of broadcasting a target broadcast control channel signal, the monitoring method further includes the following steps.

At step S101a, a current time after a movement state of the vehicle is a target movement state is acquired; and At step S102b, when it is detected that the current time meets a preset time range, the step of broadcasting a target broadcast control channel signal is performed.

Herein, if it is detected that the current time after a movement state of the vehicle is a target movement state meets a preset time range, it is indicated that a condition of initiating monitoring is met, and the step of broadcasting a target broadcast control channel signal is performed. If it is detected that the current time after a movement state of the vehicle is a target movement state does not meet the preset time range, it is indicated that the condition of initiating monitoring is not met, and the step of acquiring a current time after a movement state of the vehicle is a target movement state is continuously performed. The preset time range may be set according to actual needs. For example, the present time range can be set as from 8:00 PM to 6:00 AM.

In this way, a target broadcast control channel signal is broadcast only when the current time after a movement state of the vehicle is a target movement state meets the preset time range. Accordingly, it can effectively save the consumption of resources, and it can be adapted to various needs with flexible manners.

Figure 4:
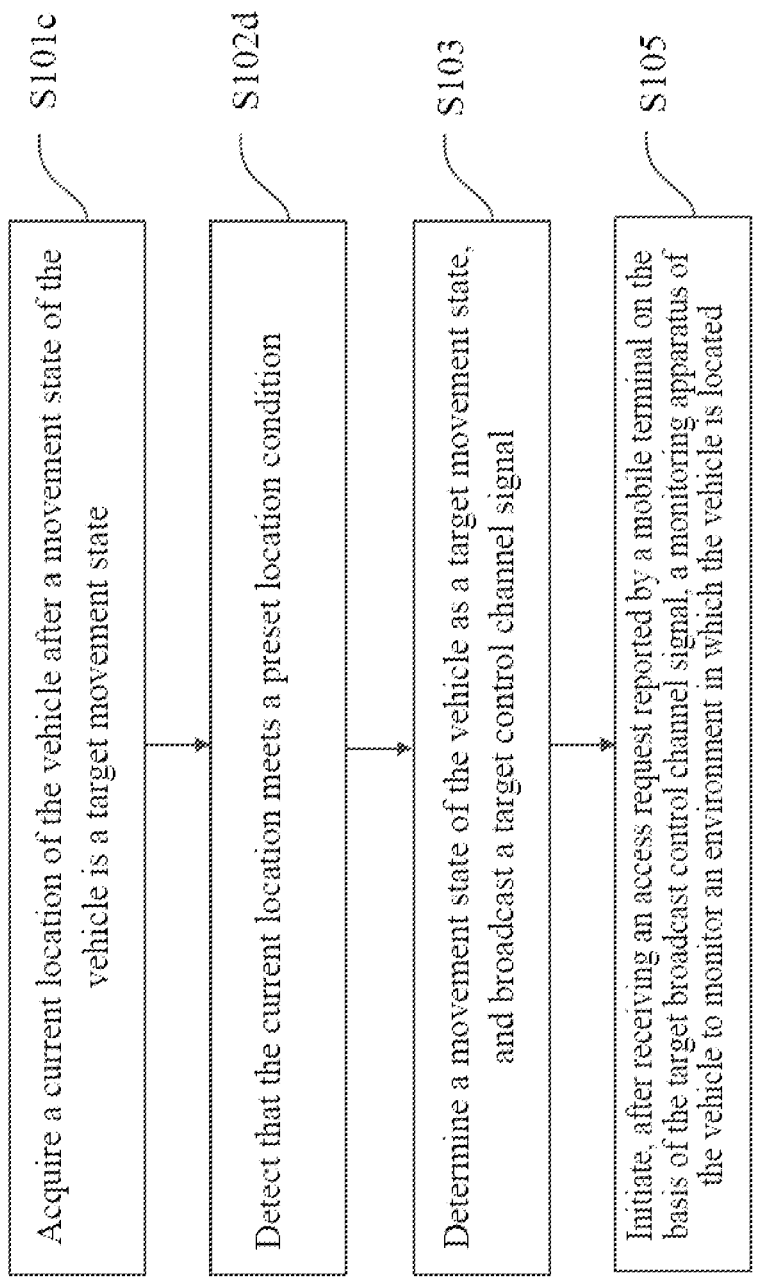
FIG. 4 schematically shows a flowchart of a monitoring method according to another embodiment of the present disclosure.

In an exemplary embodiment, as shown in FIG. 4, before the step of broadcasting a target broadcast control channel signal, the monitoring method further includes the following steps.

At step S101c, a current location of the vehicle after a movement state of the vehicle is a target movement state is acquired; and at step S101d, when it is detected that the current location meets a preset location condition, the step of broadcasting a target broadcast control channel signal is performed.

Herein, if it is detected that the current location of the vehicle after a movement state of the vehicle is a target movement state meets a preset location condition, it is indicated that a condition of initiating monitoring is met, and the step of broadcasting a target broadcast control channel signal is performed. If it is detected that the current location of the vehicle after a movement state of the vehicle is a target movement state does not meet the preset location condition, it is indicated that the condition of initiating monitoring is not met, and the step of acquiring a current location of the vehicle after a movement state of the vehicle is a target movement state is performed. The current location of the vehicle can be acquired through the global positioning system (GPS), the Beidou Navigation Satellite system, and so on. The preset location condition may be set according to actual needs. For example, the preset location condition may be set as being out of a city area according to city planning. If the current location of the vehicle after a movement state of the vehicle is a target movement state is out of the city area, it is indicated that the current location meets the preset location condition. Also, the preset location condition may be set as being outside the $3^{rd}$ Ring Road according to city road planning. If the current location of the vehicle after a movement state of the vehicle is a target movement state is outside the $3^{rd}$ Ring Road, it is indicated that the current location meets the preset location condition.

In this way, a target broadcast control channel signal is broadcast only when the current location of the vehicle after a movement state of the vehicle is a target movement state meets the preset location condition. Accordingly, it can effectively save the consumption of resources, and it can be adapted to various needs with flexible manners.

Figure 5:
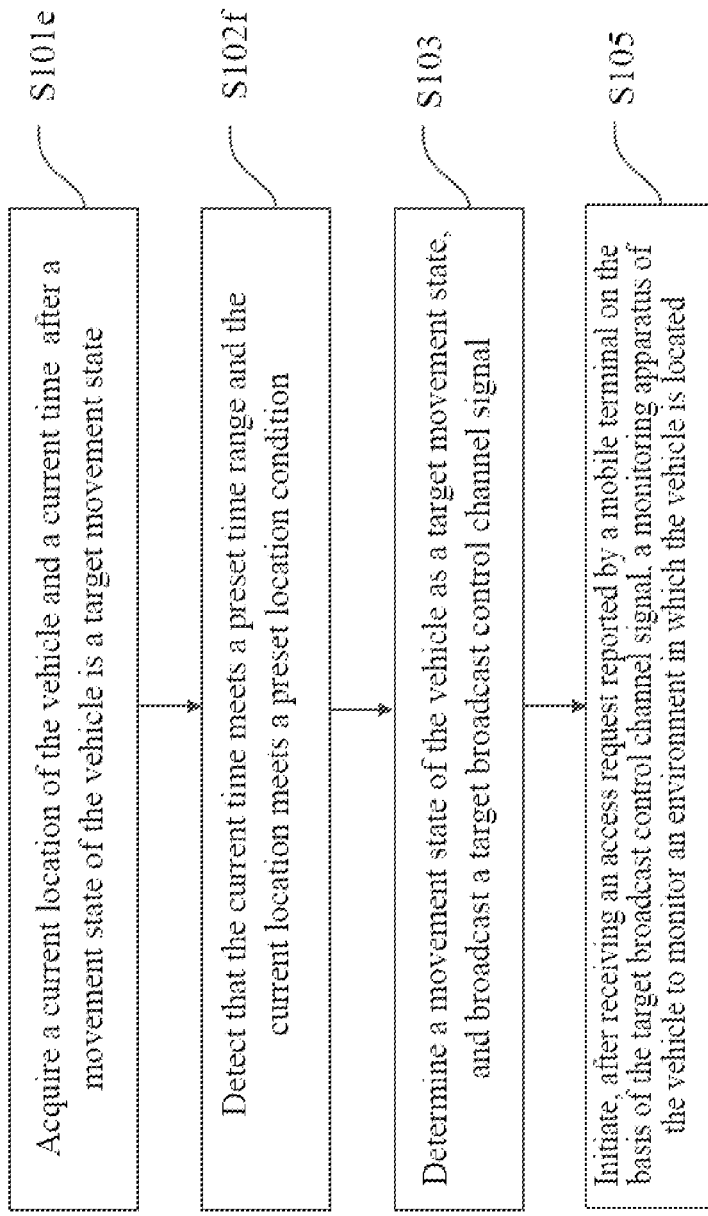
FIG. 5 schematically shows a flowchart of a monitoring method according to another embodiment of the present disclosure.

In an exemplary embodiment, as shown in FIG. 5, before the step of broadcasting a target broadcast control channel signal, the monitoring method further includes the following steps.

At step S101e, a current location of the vehicle and a current time after a movement state of the vehicle is a target movement state are acquired; and at step S101f, when it is detected that the current time meets a preset time range and the current location meets a preset location condition, the step of broadcasting a target broadcast control channel signal is performed.

Herein, if it is detected that the current location meets a preset location condition and the current time meets a preset time range, it is indicated that a condition of initiating monitoring is met, and the step of broadcasting a target broadcast control channel signal is performed. If it is detected that the current location does not meet the preset location condition and/or the current time does not meet the preset time range, it is indicated that the condition of initiating monitoring is not met, and the step of acquiring a current location of the vehicle and a current time after a movement state of the vehicle is a target movement state is performed. The current location of the vehicle can be acquired through the GPS, the Beidou Navigation Satellite system, and so on. The preset location condition may be set according to actual needs. For example, the preset location condition may be set as being out of a city area according to city planning. If the current location of the vehicle after a movement state of the vehicle is a target movement state is out of the city area, it is indicated that the current location meets the preset location condition. Also, the preset location condition may be set as being outside the $3^{rd}$ Ring Road according to city road planning. If the current location of the vehicle after a movement state of the vehicle is a target movement state is outside the $3^{rd}$ Ring Road, it is indicated that the current location meets the preset location condition.

The preset time range may be set according to actual needs. For example, the present time range can be set as from 8:00 PM to 6:00 AM.

In this way, a target broadcast control channel signal is broadcast only when the current time meets a preset time range and the current location meets the preset location condition. Accordingly, it can effectively save the consumption of resources, and it can be adapted to various needs with flexible manners.

Figure 6:
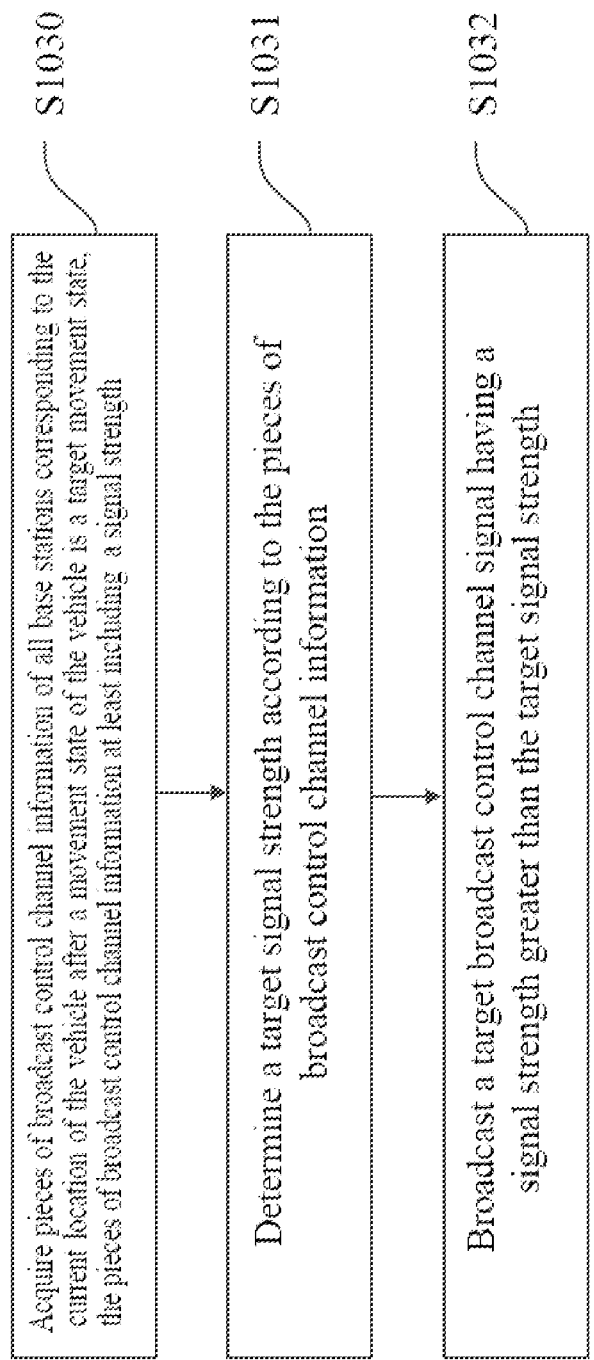
FIG. 6 schematically shows a flowchart of broadcasting a target broadcast control channel signal according to an embodiment of the present disclosure.

In an exemplary embodiment, as shown in FIG. 6, the step of broadcasting a target broadcast control channel signal includes the following steps S1030 to S1032.

At step S1030, pieces of broadcast control channel information of all base stations corresponding to the current location of the vehicle after a movement state of the vehicle is a target movement state are acquired. The pieces of broadcast control channel information at least include a signal strength.

Herein, all base stations corresponding to the current location of the vehicle include both a serving base station corresponding to the current location of the vehicle and an adjacent base station corresponding to the current location of the vehicle. The serving base station may refers to a base station which provides a service for the current location of the vehicle, and the adjacent base station may refer to a base station adjacent to the serving base station. It should be noted that if the current location of the vehicle is in an overlapping area of cellular coverage areas of two adjacent base stations, the serving base station may refers to a base station corresponding to a broadcast control channel signal which has a greater signal strength at the current location of the vehicle. Correspondingly, pieces of broadcast control channel information of all base stations corresponding to the current location of the vehicle include both a piece of broadcast control channel information of the serving base station corresponding to the current location of the vehicle and a piece of broadcast control channel information of the adjacent base station corresponding to the current location of the vehicle. The signal strength is used for identifying a corresponding strength of a broadcast control channel signal sent by a base station when the broadcast control channel signal is received at the current location of the vehicle. Generally, a broadcast control channel signal sent by a base station which is closer to the current location of the vehicle has a corresponding stronger signal strength at the current location of the vehicle, and a broadcast control channel signal sent by a base station which is farther from the current location of the vehicle has a corresponding weaker signal strength at the current location of the vehicle. In addition, the piece of broadcast control channel information may further include a location area code (LAC), and the LAC is used for identifying a coverage area of the base station.

It should be noted that, the piece of broadcast control channel information further includes a carrier frequency. The carrier frequency is used for identifying a frequency of the broadcast control channel signal sent by the base station. The pieces of broadcast control channel information of all base stations corresponding to the current location of the vehicle after a movement state of the vehicle is a target movement state may be acquired through an antenna. The antenna may be a vehicle-mounted antenna of the vehicle, and may also be an antenna or an antenna module disposed according to actual needs.

At step S1031, a target signal strength is determined according to the pieces of broadcast control channel information.

Herein, the target signal strength should be equal to or greater than any of signal strengths included in the pieces of broadcast control channel information. A piece of broadcast control channel information having the strongest signal strength among the broadcast control channels may be the piece of broadcast control channel information of the serving base station corresponding to the current location of the vehicle, and may also be the piece of broadcast control channel information of the adjacent base station corresponding to the current location of the vehicle. Specifically, the piece of broadcast control channel information having the strongest signal strength is determined according to the distance between the current location of the vehicle and the serving base station and the distance between the current location of the vehicle and the adjacent base station, or is determined according to relative positions between a cellular coverage area of the serving base station and the current location of the vehicle and relative positions between a cellular coverage area of the adjacent base station and the current location of the vehicle.

It should be understood that, a target carrier frequency may be acquired according to the pieces of broadcast control channel information. The target carrier frequency may be the same as any of carrier frequencies included in the pieces of broadcast control channel information. In order to avoid interference, the target carrier frequency should be different from a carrier frequency corresponding to the piece of broadcast control channel information having the strongest signal strength among the broadcast control channels. In order to avoid interference more effectively, the target carrier frequency is different from any of carrier frequencies included in the pieces of broadcast control channel information. A step of acquiring the target carrier frequency may compare the carrier frequencies included in the pieces of broadcast control channel information with a set list of carrier frequencies and select from the list of carrier frequencies any carrier frequency that is different from the carrier frequencies included in the pieces of broadcast control channel information as the target carrier frequency. The set list of carrier frequencies may be a list of carrier frequencies of all base stations within a certain regional scope.

At step S1032, a target broadcast control channel signal having a signal strength greater than the target signal strength is broadcast.

It should be understood that, according to the principle for a mobile terminal, such as a mobile phone, to get access to a base station, the mobile phone, when operates normally, continuously scans a carrier frequency of a broadcast control channel signal sent by an adjacent base station and calculates a signal strength of the broadcast control channel signal of the adjacent base station. When the signal strength of the broadcast control channel signal of the adjacent base station is greater than the signal strength of the broadcast control channel signal of the base station that the mobile phone currently gets access to, it is considered that the mobile phone has moved to a cellular coverage area of the adjacent base station. At this time, the mobile phone automatically switches to get access to the adjacent base station, i.e., reports an access request. Therefore, when the mobile enters the monitoring-triggered scope of the vehicle and calculates that the signal strength of the target broadcast control channel signal is greater than the signal strength of the broadcast control channel signal of the base station that the mobile phone currently gets access to, the mobile phone reports an access request on the basis of the target broadcast control channel signal, so as to request to get access to a simulated base station corresponding to the target broadcast control channel signal. Herein, the target broadcast control channel signal carries a set location area code. The set location area code is used for identifying an area in which the monitoring-triggered scope of the vehicle is located, and may be set according to actual needs. The target broadcast control channel signal may also carry the target carrier frequency. The step of sending a target broadcast control channel signal having a signal strength greater than the target signal strength may be sending a target broadcast control channel signal having a signal strength greater than the target signal strength on the basis of the target carrier frequency.

In this way, by sending a target broadcast control channel signal having a signal strength greater than the target signal strength, it is ensured that when a mobile terminal approaches, an access request reported by the mobile terminal on the basis of the target broadcast control channel signal can be received. That is, when it is determined that a person is in the monitoring-triggered scope of the vehicle, the monitoring apparatus of the vehicle is initiated to monitor an environment in which the vehicle is located, so as to further effectively monitor and protect the vehicle.

In an exemplary embodiment, the step S1031 of determining a target signal strength according to the pieces of broadcast control channel information includes the following step:

According to the signal strengths included in the pieces of broadcast control channel information, the strongest signal strength among the signal strengths is selected as the target signal strength.

For example, assuming that the pieces of broadcast control channel information include signal strengths of broadcast control channel signals corresponding to four base stations and the signal strengths are respectively 2 dBm, 20 dBm, 21 dBm, and 41 dBm, 41 dBm is selected as the target signal strength. It should be noted that, the step of acquiring a target carrier frequency according to the pieces of broadcast control channel information may be selecting, according to carrier frequencies included in the pieces of broadcast control channel information, a carrier frequency corresponding to a piece of broadcast control channel information having the weakest signal strength among the broadcast control channels as the target carrier frequency. For example, assuming that the pieces of broadcast control channel information include signal strengths of broadcast control channel signals corresponding to four base stations and the signal strengths are respectively 2 dBm, 20 dBm, 21 dBm, and 41 dBm, a carrier frequency corresponding to the piece of broadcast control channel information having the signal strength of 2 dBm is used as the target carrier frequency. By using a carrier frequency corresponding to a piece of broadcast control channel information having the weakest signal strength among the broadcast control channels as the target carrier frequency, a risk of generating interference between the target broadcast control channel signal sent on the basis of the target carrier frequency and a broadcast control channel signal sent by the serving base station corresponding to the current location of the vehicle can be effectively reduced with simple operation.

In this way, by using a signal strength corresponding to a piece of broadcast control channel information having the strongest signal strength among the broadcast control channels as the target signal strength so as to broadcast a target broadcast control channel signal having a signal strength greater than the target signal strength, it is ensured that the mobile terminal reports an access request on the basis of the target broadcast control channel signal with simple operation.

Figure 7:
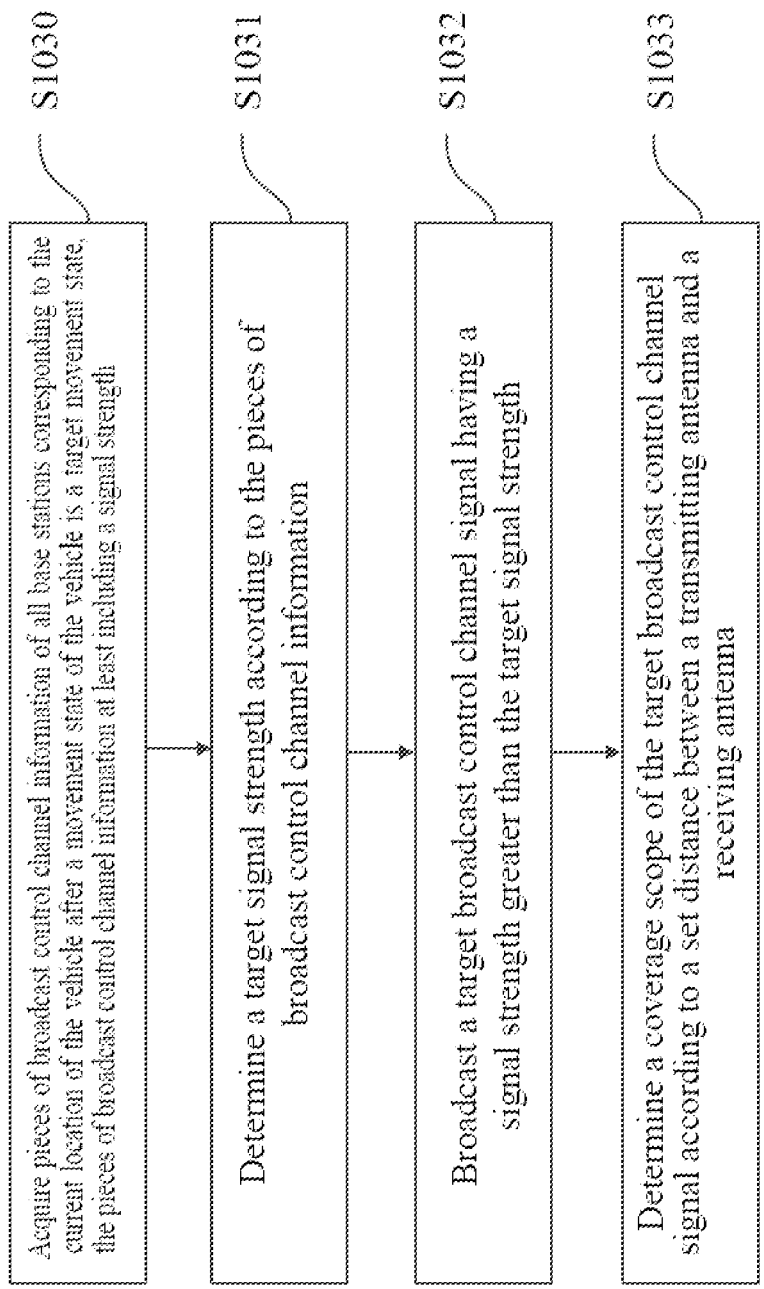
FIG. 7 schematically shows a flowchart of a monitoring method according to another embodiment of the present disclosure.

In an exemplary embodiment, as shown in FIG. 7, after the step of broadcasting a target broadcast control channel signal having a signal strength greater than the target signal strength, the monitoring method further includes the following step:

at step S1033, a coverage scope of the target broadcast control channel signal is determined according to the set distance between the transmitting antenna and the receiving antenna.

Herein, a signal strength of the target broadcast control channel signal broadcast by the transmitting antenna at the receiving antenna may be acquired through the receiving antenna. Therefore, according to a signal strength fed back by the receiving antenna, the signal strength of the target broadcast control channel signal at the receiving antenna may be adjusted by adjusting the power at which the transmitting antenna transmits the target broadcast control channel signal, so that a coverage scope of the target broadcast control channel signal is controlled. In this way, the operation is simple, and the coverage scope of the target broadcast control channel signal can be effectively controlled so as to avoid affecting the normal communication of irrelevant mobile terminals.

Figure 8:
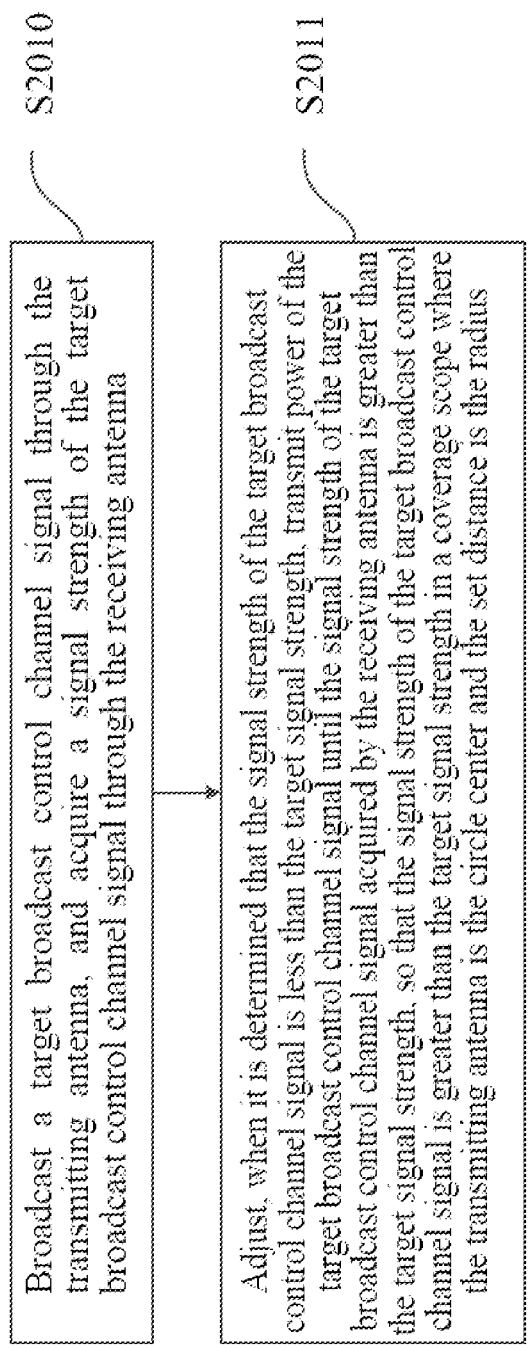
FIG. 8 schematically shows a flowchart of determining a coverage range of the target broadcast control channel signal according to a set distance between a transmitting antenna and a receiving antenna according to an embodiment of the present disclosure.

In an exemplary embodiment, as shown in FIG. 8, the step of determining a coverage scope of the target broadcast control channel signal according to the set distance between the transmitting antenna and the receiving antenna includes the following steps S2010 to S2011:

at step S2010, a target broadcast control channel signal is broadcast through the transmitting antenna, and a signal strength of the target broadcast control channel signal is acquired through the receiving antenna; and at step S2011, when it is determined that the signal strength of the target broadcast control channel signal is less than the target signal strength, the transmit power of the target broadcast control channel signal is adjusted until the signal strength of the target broadcast control channel signal acquired by the receiving antenna is greater than the target signal strength, so that the signal strength of the target broadcast control channel signal is greater than the target signal strength in a coverage scope where the transmitting antenna is the center and the set distance is the radius.

Herein, if the signal strength of the target broadcast control channel signal sent and broadcast by the transmitting antenna and acquired through the receiving antenna is less than the target signal strength, the transmit power of the target broadcast control channel signal is adjusted, so as to increase the signal strength of the target broadcast control channel signal received by the receiving antenna until the signal strength of the target broadcast control channel signal acquired by the receiving antenna is greater than the target signal strength. It should be understood that, when the signal strength of the target broadcast control channel signal acquired by the receiving antenna is greater than the target signal strength, it is indicated that the signal strength of the target broadcast control channel signal is greater than the target signal strength in a circular area where the transmitting antenna is the circle center and the set distance is the radius. The circular area may be considered as part of a coverage scope of the target broadcast control channel signal, i.e., the monitoring-triggered scope of the vehicle. At this time, the signal strength of the target broadcast control channel signal is less than or equal to the target signal strength outside the circular area which has the transmitting antenna as its circle center and the set distance as its radius.

In this way, by controlling the signal strength of the target broadcast control channel signal, the coverage scope of the target broadcast control channel signal is controlled indirectly, so that the monitoring-triggered scope of the vehicle is controlled with flexible manners and simple operation.

Figure 9:
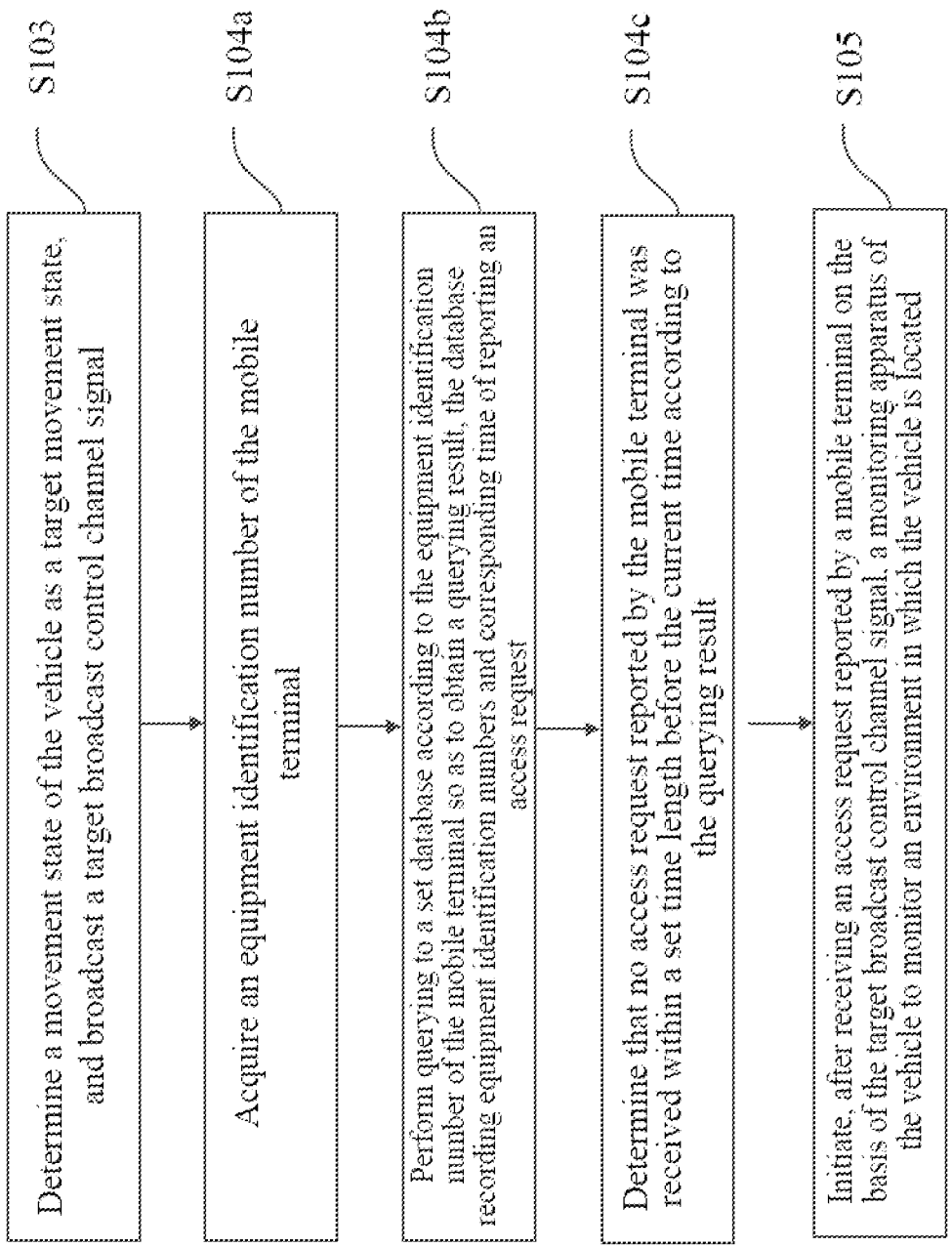
FIG. 9 schematically shows a flowchart of a monitoring method according to another embodiment of the present disclosure.

In an exemplary embodiment, as shown in FIG. 9, before the step of initiating a monitoring apparatus of the vehicle to monitor an environment in which the vehicle is located, the monitoring method further includes following steps:

at step S104a, an equipment identification number of the mobile terminal is acquired;

at step S104b, querying is performed to a set database according to the equipment identification number of the mobile terminal so as to obtain a querying result. The database records equipment identification numbers and corresponding time of reporting an access request; and at step S104c, it is determined that no access request reported by the mobile terminal is received within a set time length before the current time according to the querying result, and the step of initiating a monitoring apparatus of the vehicle to monitor an environment in which the vehicle is located is performed.

Herein, the step of acquiring the equipment identification number of the mobile terminal may be acquiring the equipment identification number of the mobile terminal carried in the access request according to the access request reported by the mobile terminal, or may be acquiring the equipment identification of the mobile terminal through information exchange with the mobile terminal after allowing the mobile terminal to get access according to the access request. The equipment identification number of the mobile terminal, serving as an identifier of the mobile terminal, may be an international mobile user identification number of the mobile terminal, and may also be an international mobile equipment identification number of the mobile terminal and so on. The database stores the time when each mobile terminal reports its access request and also stores corresponding equipment identification numbers. The time length may be set according to actual needs. For example, the time length may be set as 30 minutes or 60 minutes and so on. If it is determined that no access request reported by the mobile terminal was received within a set time length before the current time by performing querying to the set database according to the equipment identification number of the mobile terminal, it is indicated that either the mobile terminal may enter the monitoring-triggered scope of the vehicle for the first time or it may have entered the monitoring-triggered scope of the vehicle only beyond the set time length before the current time. At this time, it requires to use the monitoring apparatus to record information on an environment around the vehicle so as to protect the vehicle, and so it is allowed to initiate the monitoring apparatus of the vehicle for performing monitoring. If it is determined that an access request reported by the mobile terminal was received within a set time length before the current time by performing querying to the set database according to the international mobile user identification number of the mobile terminal, it is indicated that the mobile terminal has entered the monitoring-triggered scope of the vehicle within the set time length before the current time. The monitoring apparatus has recorded information on an environment around the vehicle when the mobile terminal entered the monitoring-triggered scope of the vehicle, and the vehicle may be protected according to the recorded information on the environment around the vehicle. In this case, it is not allowed to initiate the monitoring apparatus of the vehicle to monitor the environment in which the vehicle is located, so as to avoid occupying too many storage resources and control power consumption, thereby realizing saving consumption of resources.

An example is provided, in which the mobile terminal is a mobile phone, a peripheral device identification number is an international mobile user identification number, and the monitoring apparatus is an automobile data recorder. It is assumed that the set time length is 30 minutes, and an access request a reported by a mobile phone A is received currently. If a querying is performed to a set database according to the international mobile user identification number of the mobile phone A and it is known that an access request b reported by the mobile phone A was received ten minutes ago and the automobile data recorder of the vehicle was initiated to record a video according to the access request b, it is not allowed to initiate the automobile data recorder of the vehicle to record a video at a current time since a time difference between the time of receiving the access request b and the time of receiving the access request a is less than the set time length. If 45 minutes later after the current time, an access request c reported by the mobile phone A is received, it is allowed to initiate the automobile data recorder of the vehicle to record a video since the time difference between the time of receiving the access request c and the time of receiving the access request a is greater than the set time length.

In this way, since the monitoring apparatus of the vehicle is initiated to monitor an environment in which the vehicle is located only after it is determined that a mobile terminal which reports an access request has not reported an access request within the set time length before a current time, it can be ensured that the vehicle is effectively monitored and protected, and meanwhile consumption of resources can be saved.

Figure 10:
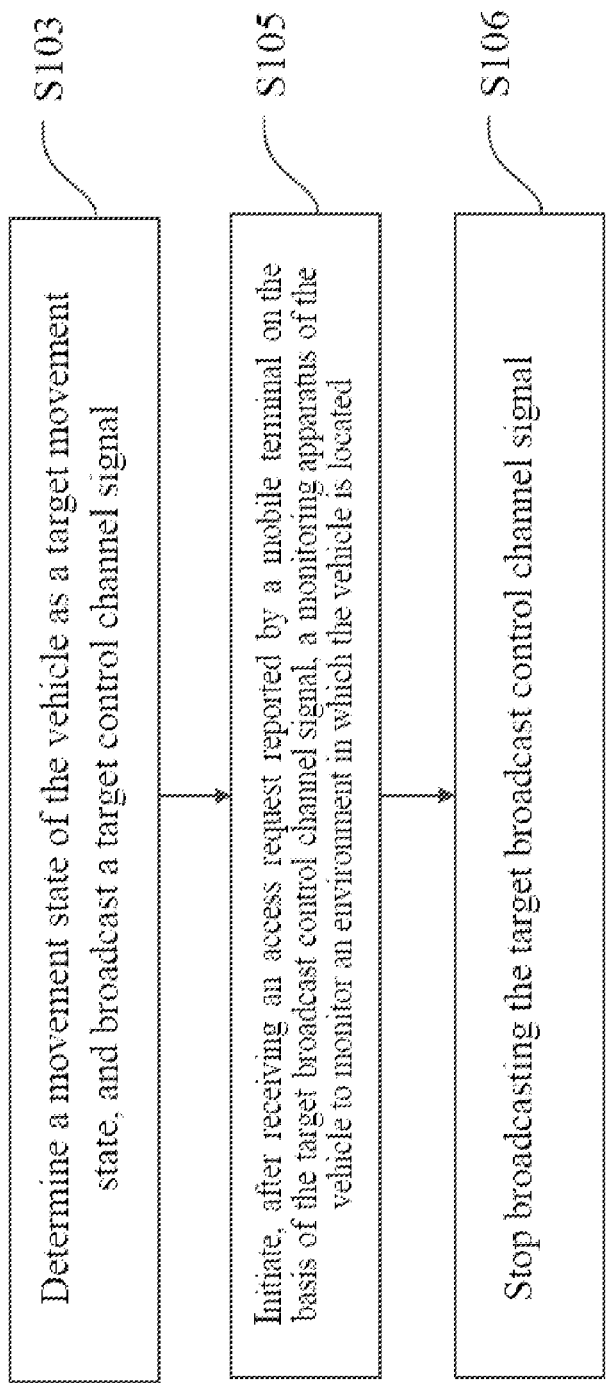
FIG. 10 schematically shows a flowchart of a monitoring method according to another embodiment of the present disclosure.

In an exemplary embodiment, as shown in FIG. 10, after the step of initiating the monitoring apparatus of the vehicle to monitor an environment in which the vehicle is located, the monitoring method further includes the following step:

at step S106, broadcasting the target broadcast control channel signal is stopped.

Herein, after initiating the monitoring apparatus of the vehicle to monitor an environment in which the vehicle is located, broadcasting the target broadcast control channel signal is stopped, so that the mobile terminal can normally get access to the base station for communication. After the mobile phone gets access to the simulated base station corresponding to the target broadcast control channel signal, the mobile terminal cannot normally use services such as calling. Therefore, in order to ensure that the mobile terminal can normally use services such as calling, after initiating the monitoring apparatus of the vehicle to monitor an environment in which the vehicle is located, broadcasting the target broadcast control channel signal is stopped in time, so that the mobile phone can normally get access to the base station again. It should be noted that, since a time length required from sending a target broadcast control channel signal having a signal strength greater than the target signal strength on the basis of the target carrier frequency to stopping sending the target broadcast control channel signal after initiating the monitoring apparatus of the vehicle to monitor an environment in which the vehicle is located is relatively short, normal communication of the mobile terminal is generally not affected. If broadcasting the target broadcast control channel signal is not stopped in time, the mobile terminal would not normally use services such as calling.

In this way, normal communication of the mobile terminal can be effectively ensured by stopping broadcasting the target broadcast control channel signal after initiating the monitoring apparatus of the vehicle to monitor an environment in which the vehicle is located.

In an exemplary embodiment, the step of initiating the monitoring apparatus of the vehicle to monitor an environment in which the vehicle is located includes the following step:

the automobile data recorder of the vehicle is initiated to record a video of an environment in which the vehicle is located.

Herein, when the monitoring apparatus of the vehicle includes an automobile data recorder, correspondingly, the step of initiating the monitoring apparatus of the vehicle to monitor an environment in which the vehicle is located may be initiating the automobile data recorder of the vehicle to record a video of an environment in which the vehicle is located, so as to monitor and protect the vehicle.

In an exemplary embodiment, after the step of initiating the automobile data recorder of the vehicle to record a video of an environment in which the vehicle is located, the monitoring method further includes the following step:

the recording of a video is timed, and the automobile data recorder of the vehicle is turned off after it is determined that the time length of the recording reaches a set time threshold.

Specifically, after initiating the automobile data recorder of the vehicle to record a video of an environment in which the vehicle is located, the recording of a video by the automobile data recorder of the vehicle is timed, and the automobile data recorder of the vehicle is turned off when it is determined that the time length of the recording reaches a set time threshold.

Herein, the time threshold may be set according to actual needs. For example, the time threshold may be set as one minute or three minutes, and so on. It can be understood that, information on an environment around the vehicle within the timed time length is recorded in the video. Therefore, the information on the environment around the vehicle within the timed time length can be learned according to the video, so as to provide protection to the vehicle as well as vehicles or objects around the vehicle.

In this way, the automobile data recorder of the vehicle is turned off in time when it is determined that the timed time length of recording a video by the automobile data recorder of the vehicle reaches a set time threshold, and thus a need of monitoring an environment around the vehicle by recording a video is met so as to realize effective monitoring and protecting the vehicle, and moreover consumption of a lot of resources resulted from recording a video for a long time can be avoided, i.e., resources can be saved.

In an exemplary embodiment, after the step of turning off the automobile data recorder of the vehicle, the monitoring method further includes the following step:

the equipment identification number of the mobile terminal is stored in a manner of corresponding to the time of receiving the access request and the video respectively.

Herein, the step of storing the equipment identification number of the mobile terminal in a manner of corresponding to the time of receiving the access request and the video respectively may be storing the equipment identification number of the mobile terminal after bonding the equipment identification number of the mobile terminal with the time of receiving the access request and the video respectively, so as to realize learning the time of reporting the access request corresponding to the equipment identification number of the mobile terminal only by performing querying of the equipment identification number of the mobile terminal and realize acquiring the international mobile user identification number of the mobile terminal correspondingly bonded with the video according to the video. Assuming that a person has damaged the vehicle, personal information of the person who has damaged the vehicle can be tracked through a video recording the vehicle damage and then the equipment identification number of the mobile terminal bonded with the video, so as to realize effective protection to the vehicle. It should be noted that, the equipment identification number of the mobile terminal, the time of receiving the access request, and the video may be stored in the database. It should be noted that, the equipment identification number of the mobile terminal may be acquired before initiating the automobile data recorder of the vehicle to record a video, for example, acquired directly from the access request, and may also be acquired after initiating the automobile data recorder of the vehicle to record a video.

In this way, by storing an equipment identification number of the mobile terminal in a manner of corresponding to the time of receiving the access request and the video respectively, evidence can be provided for protection of the vehicle, and querying when needed can be facilitated, which further improves effectiveness of monitoring and protecting the vehicle.

Figure 11:
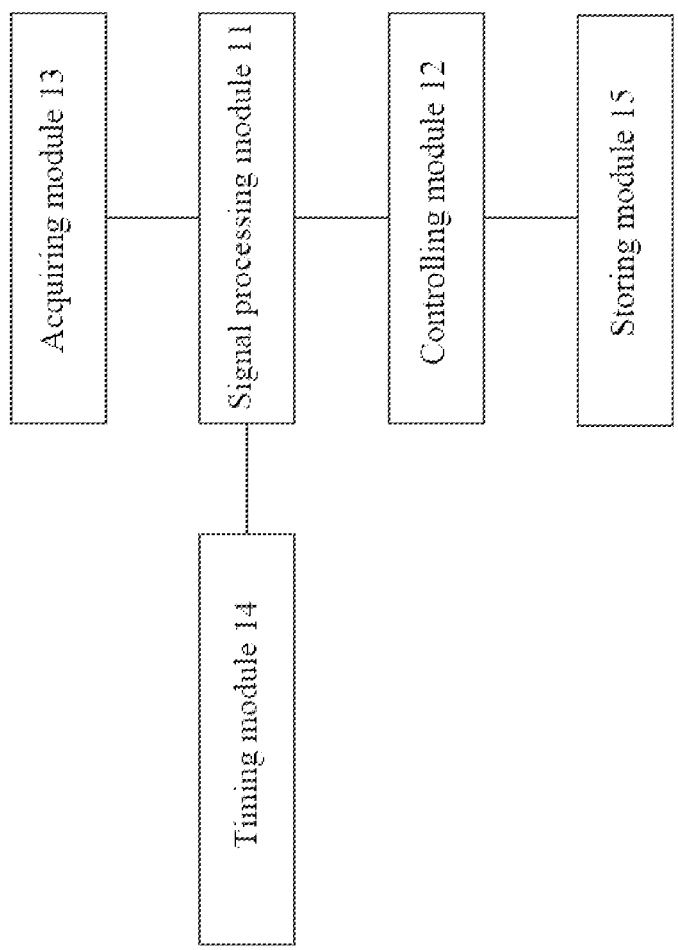
FIG. 11 schematically shows a structure of a monitoring device according to an embodiment of the present disclosure.

In order to implement the above method, an embodiment of the present disclosure further provides a monitoring device applied to a vehicle, as shown in FIG. 11. The monitoring device includes the following modules:

a signal processing module 11, which is used for determining a movement state of the vehicle as a target movement state and broadcasting a target broadcast control channel signal; and a controlling module 12, which is used for initiating a monitoring apparatus of the vehicle to monitor an environment in which the vehicle is located after an access request reported by a mobile terminal on the basis of the target broadcast control channel signal is received.

To sum up, according to the monitoring device provided in the above embodiment, after a movement state of the vehicle is determined as a target movement state, a target broadcast control channel signal is broadcast; and after an access request reported by a mobile terminal on the basis of the target broadcast control channel signal is received, a monitoring apparatus of the vehicle is initiated to monitor an environment in which the vehicle is located. In this way, after a movement state of the vehicle is a target movement state, the vehicle broadcasts a target broadcast control channel signal, so that when the mobile terminal approaches, the vehicle can receive an access request reported by the mobile terminal on the basis of the target broadcast control channel signal. That is, if it is determined that a person is in a monitoring-triggered scope of the vehicle, the monitoring apparatus of the vehicle is initiated to monitor an environment in which the vehicle is located, so as to monitor and protect the vehicle effectively.

In an exemplary embodiment, the vehicle includes a transmitting antenna and a receiving antenna which is disposed at a set distance away from the transmitting antenna. The transmitting antenna is used for broadcasting the target broadcast control channel signal, and the receiving antenna is used for receiving the access request.

In an exemplary embodiment, the monitoring device further includes an acquiring module 13, which is used for acquiring, after a movement state of the vehicle is a target movement state, at least either of following pieces of information: a current location of the vehicle and a current time.

The signal processing module 11 is specifically used for: performing the step of broadcasting a target broadcast control channel signal when it is detected that the current time meets a preset time range; or performing the step of broadcasting a target broadcast control channel signal when it is detected that the current location meets a preset location condition; or performing the step of broadcasting a target broadcast control channel signal when it is detected that the current time meets a preset time range and the current location meets a preset location condition.

In this way, a target broadcast control channel signal is broadcast only when the current time meets a preset time range and/or the current location meets the preset location condition after a movement state of the vehicle is a target movement state. Accordingly, it can effectively save consumption of resources and it can be adapted to different needs with flexible manners.

In an exemplary embodiment, the signal processing module 11 is specifically used for:
acquiring pieces of broadcast control channel information of all base stations corresponding to the current location of the vehicle after a movement state of the vehicle is a target movement state, the pieces of broadcast control channel information at least including a signal strength;
determining a target signal strength according to the pieces of broadcast control channel information; and
broadcasting a target broadcast control channel signal having a signal strength greater than the target signal strength.

In this way, since a target broadcast control channel signal having a signal strength greater than the target signal strength is broadcast, it is ensured that when a mobile terminal approaches, an access request reported by the mobile terminal on the basis of the target broadcast control channel signal can be received. That is, if it is determined that a person is in the monitoring-triggered scope of the vehicle, the monitoring apparatus of the vehicle is initiated to monitor an environment in which the vehicle is located, so as to further effectively monitor and protect the vehicle.

In an exemplary embodiment, the signal processing module 11 is specifically used for:
selecting, according to signal strengths included in the pieces of broadcast control channel information, the strongest signal strength among the signal strengths as the target signal strength.

In this way, it is ensured that the mobile terminal reports an access request on the basis of the target broadcast control channel signal with simple operation by using the signal strength corresponding to the piece of the broadcast control channel information having the strongest signal strength among the broadcast control channels as the target signal strength so as to broadcast a target broadcast control channel signal having a signal strength greater than the target signal strength In an exemplary embodiment, the signal processing module 11 is further used for: determining a coverage scope of the target broadcast control channel signal according to the set distance between the transmitting antenna and the receiving antenna.

In this way, the operation is simple, and the coverage scope of the target broadcast control channel signal can be effectively controlled so as to avoid affecting normal communication of irrelevant mobile terminals.

In an exemplary embodiment, the signal processing module 11 is specifically used for:
broadcasting a target broadcast control channel signal through the transmitting antenna, and acquiring a signal strength of the target broadcast control channel signal through the receiving antenna;
adjusting, when it is determined that the signal strength of the target broadcast control channel signal is less than the target signal strength, transmit power of the target broadcast control channel signal is adjusted until the signal strength of the target broadcast control channel signal acquired by the receiving antenna is greater than the target signal strength, so that the signal strength of the target broadcast control channel signal is greater than the target signal strength in a coverage scope where the transmitting antenna is the circle center and the set distance is the radius.

In this way, the coverage scope of the target broadcast control channel signal is controlled indirectly by controlling the signal strength of the target broadcast control channel signal, so that the monitoring-trigged scope of the vehicle is controlled. The manner is flexible, and the operation is simple.

In an exemplary embodiment, the acquiring module 13 is further used for: acquiring an equipment identification number of the mobile terminal; and
the controlling module 12 is further used for: performing querying to a set database according to the equipment identification number of the mobile terminal so as to obtain a querying result, the database recording equipment identification numbers and corresponding time of reporting an access request; and when it is determined that an access request reported by the mobile terminal was received within a set time length before the current time according to the querying result, performing the step of initiating a monitoring apparatus of the vehicle to monitor an environment in which the vehicle is located.

In this way, a monitoring apparatus of the vehicle to perform monitoring is performed only when it is determined that the mobile terminal currently reporting an access request didn't report any access request within a set time length before the current time, and thus it can be ensured that consumption of resources is saved while effectively monitoring and protecting the vehicle.

In an exemplary embodiment, the controlling module 12 may be further used for stopping broadcasting the target broadcast control channel signal.

In this way, normal communication of the mobile terminal can be effectively ensured by stopping broadcasting the target broadcast control channel signal after initiating the monitoring apparatus of the vehicle to monitor an environment in which the vehicle is located.

In an exemplary embodiment, the controlling module 12 is specifically used for initiating the automobile data recorder of the vehicle to record a video.

In an exemplary embodiment, the monitoring device further includes a timing module 14, which is used for timing the recording of a video; and
the controlling module 12 is further used for turning off the automobile data recorder of the vehicle when it is determined that the timed time length reaches a set time threshold.

In this way, since the automobile data recorder of the vehicle is turned off in time when it is determined that the timed time length of recording a video by the automobile data recorder of the vehicle reaches a set time threshold, a need of monitoring an environment around the vehicle by recording a video is met so as to realize effective monitoring and protecting the vehicle, and moreover consumption of a lot of resources resulted from recording video for a long time can be avoided, i.e., resources is saved.

In an exemplary embodiment, the monitoring device further includes a storing module 15, which is used for storing an equipment identification number of the mobile terminal in a manner of corresponding to the time of receiving the access request and the video respectively.

In this way, since an equipment identification number of the mobile terminal is stored in a manner of corresponding to the time of receiving the access request and the video respectively, evidence can be provided for protection of the vehicle, and querying when needed can be facilitated, which further improves effectiveness of monitoring and protecting the vehicle.

It should be noted that, when the monitoring device provided in the above embodiments is used to implement the monitoring method, the above division of program modules is only provided as an example. In actual application, the above processing may be allocated to and completed by a different division of program modules according to needs. That is, an internal structure of the monitoring device can be divided into program modules different from the above program modules, so as to complete the whole or part of the processing described above. In addition, the monitoring device provided in the above embodiments and the corresponding monitoring method embodiments belong to the same idea, and details of the specific implementation process thereof can be found in the method embodiments and are not repeated herein.

Figure 12:
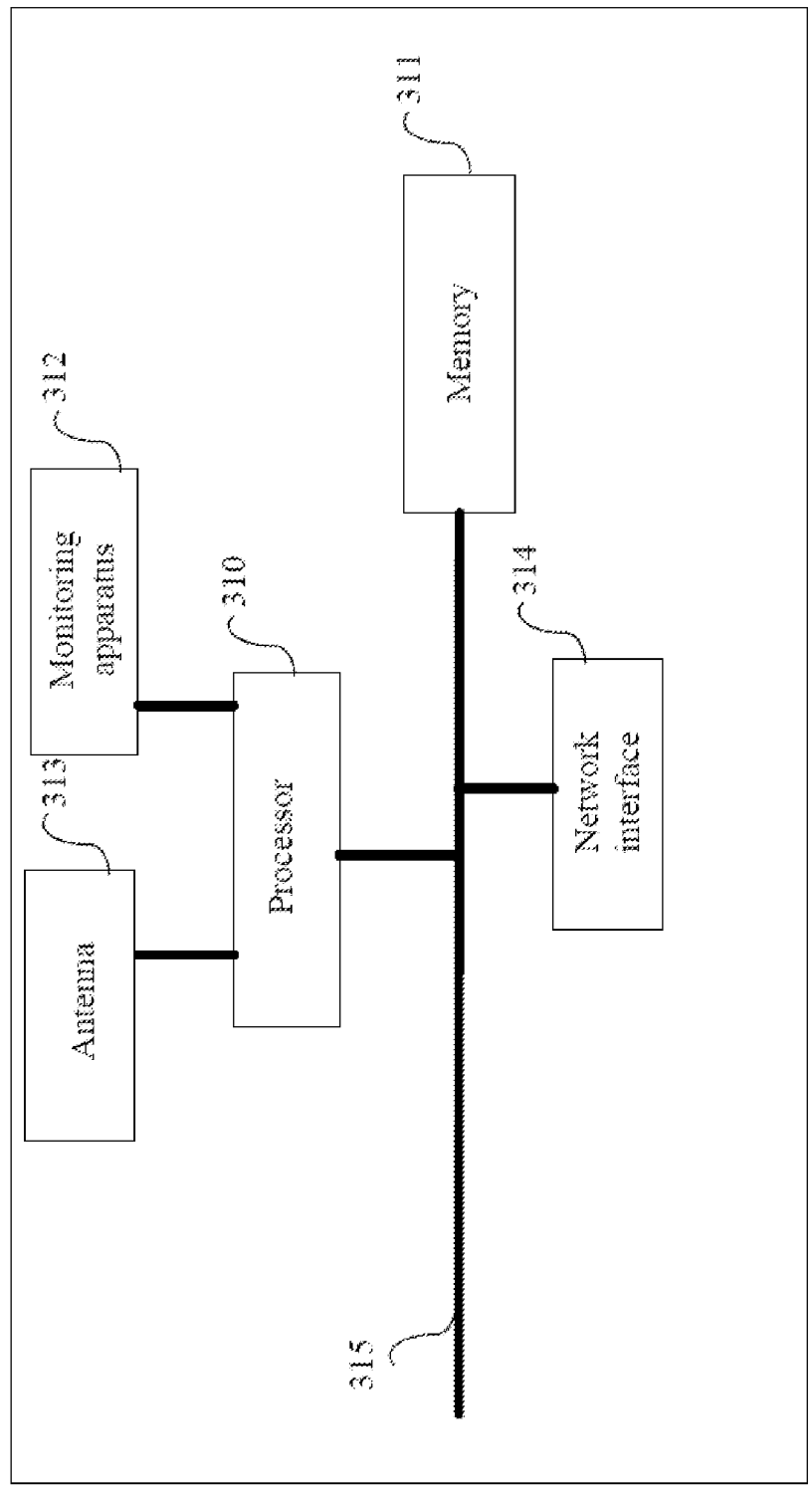
FIG. 12 schematically shows a structure of a monitoring device according to another embodiment of the present disclosure.

In another embodiment of the present disclosure, a monitoring device is provided. As shown in FIG. 12, the monitoring device includes: a processor 310, a memory 311 for storing computer programs that can be run on the processor 310, at least one monitoring apparatus 312, and an antenna 313. The monitoring apparatus 312 and the antenna 313 are respectively connected to the processor 310. Herein, the processor 310 shown in FIG. 12 is not used for indicating that the number of the processor 310 is one, but is only used for indicating a position relationship of the processor 310 and other devices. In actual application, the number of the processor 310 may be one or more. Likewise, the memory 311 shown in FIG. 12 is also for the same purpose, i.e., is only used for indicating a position relationship of the memory 311 and other devices. In actual application, the number of the memory 311 may be one or more. In an exemplary embodiment, the monitoring apparatus 312 includes a camera module. The monitoring apparatus 312 may include at least one camera module that can rotate for 360 degrees, and a 360-degree environment of the vehicle may be monitored with rotation of the camera module. The monitoring apparatus 312 may also include two or more cameras reasonably disposed in the vehicle, and the cameras can monitor the 360-degree environment of the vehicle.

The processor 310 is used for, when running the computer programs, executing the following steps of:

determining a movement state of the vehicle as a target movement state and broadcasting a target broadcast control channel signal; and initiating a monitoring apparatus of the vehicle to monitor an environment in which the vehicle is located after an access request reported by a mobile terminal on the basis of the target broadcast control channel signal is received.

In an exemplary embodiment, the processor 310 is further used for, when running the computer programs, executing the following steps of:

acquiring, after a movement state of the vehicle is a target movement state, at least either of following pieces of information: a current location of the vehicle and a current time; and performing the step of broadcasting a target broadcast control channel signal when it is detected that the current time meets a preset time range; or performing the step of broadcasting a target broadcast control channel signal when it is detected that the current location meets a preset location condition; or performing the step of broadcasting a target broadcast control channel signal when it is detected that the current time meets a preset time range and the current location meets a preset location condition.

In an exemplary embodiment, the processor 310 is further used for, when running the computer programs, executing the following steps of:

acquiring pieces of broadcast control channel information of all base stations corresponding to the current location of the vehicle after a movement state of the vehicle is a target movement state, the pieces of broadcast control channel information including at least a signal strength;

determining a target signal strength according to the pieces of broadcast control channel information; and broadcasting a target broadcast control channel signal having a signal strength greater than the target signal strength.

In an exemplary embodiment, the processor 310 is further used for, when running the computer programs, executing the following step of:

selecting, according to signal strengths included in the pieces of broadcast control channel information, the strongest signal strength among the signal strengths as the target signal strength.

In an exemplary embodiment, the processor 310 is further used for, when running the computer programs, executing the following step of:

determining a coverage scope of the target broadcast control channel signal according to a set distance between a transmitting antenna and a receiving antenna.

In an exemplary embodiment, the processor 310 is further used for, when running the computer programs, executing the following steps of:

broadcasting a target broadcast control channel signal through the transmitting antenna, and acquiring a signal strength of the target broadcast control channel signal through the receiving antenna;

adjusting, when it is determined that the signal strength of the target broadcast control channel signal is less than the target signal strength, transmit power of the target broadcast control channel signal until the signal strength of the target broadcast control channel signal acquired by the receiving antenna is greater than the target signal strength, so that the signal strength of the target broadcast control channel signal is greater than the target signal strength in a coverage scope where the transmitting antenna is the circle center and the set distance is the radius.

In an exemplary embodiment, the processor 310 is further used for, when running the computer programs, executing the following steps of:

acquiring an equipment identification number of the mobile terminal;

performing querying to a set database according to the equipment identification number of the mobile terminal so as to obtain a querying result, the database recording equipment identification numbers and corresponding time of reporting an access request; and determining whether an access request reported by the mobile terminal was received within a set time length before the current time according to the querying result, and if no, performing the step of initiating a monitoring apparatus of the vehicle to monitor an environment in which the vehicle is located.

In an exemplary embodiment, the processor 310 is further used for, when running the computer programs, executing the following step of: stopping broadcasting the target broadcast control channel signal.

In an exemplary embodiment, the processor 310 is further used for, when running the computer programs, executing the following step of: initiating the automobile data recorder of the vehicle to record a video.

In an exemplary embodiment, the processor 310 is further used for, when running the computer programs, executing the following steps of:

timing the recording of a video and turning off the automobile data recorder of the vehicle when it is determined that the timed time length of the recording reaches a set time threshold.

In an exemplary embodiment, the processor 310 is further used for, when running the computer programs, executing the following step of: storing an equipment identification number of the mobile terminal in a manner of corresponding to the time of receiving the access request and the video respectively.

The monitoring device further includes: at least one network interface 314. Various components in the monitoring device are coupled together through a bus system 315. It may be understood that, the bus system 315 is used for realizing connection and communication among these components. The bus system 315 includes not only a data bus also a power bus, a control bus, and a status signal bus. However, for the purpose of clarity, various kinds of buses are all marked as the bus system 315.

Herein, the memory 311 may be a volatile memory or a nonvolatile memory, or may also include both the volatile memory and the nonvolatile memory. Herein, the nonvolatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disc, or a compact disc read-only memory (CD-ROM). The magnetic surface memory may be a magnetic disk storage or a magnetic tape storage. The volatile memory may be a random access memory (RAM), and the RAM is used for external cache. By way of exemplary rather than limitative illustration, many forms of RAMs may be used, for example, a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). The memory 311 described in the present embodiment is intended to include, but is not limited to, these memories and any other suitable types of memories.

The memory 311 in the present embodiment is used for storing various types of data so as to support operations of the monitoring device. Examples of the data include: any computer program for operating on the monitoring device, such as an operating system and an application; data of contacts; data of a phonebook; messages; images; videos; and so on. Herein, the operating system includes various system programs, such as a framework layer, a core library layer, a driver layer, and so on, for implementing various basic services and processing hardware-based tasks. The application may include various applications, such as a media player, a browser, and so on, for implementing various application services. Herein, programs for implementing the method in embodiments of the present disclosure may be included in the application.

An embodiment of the present disclosure further provides a computer storage medium. The computer storage medium stores computer programs therein. The computer storage medium may be memories such as a ferromagnetic random access memory (FRAM), a read only memory (ROM), a programmable read-only memory (PROM), an erasable programmable read-only memory (EPROM), an electrically erasable programmable read-only memory (EEPROM), a flash memory, a magnetic surface memory, an optical disc, or a compact disc read-only memory (CD-ROM). The computer storage medium may also be various devices including one of the above memories or any combination thereof. The devices can include for example a mobile phone, a computer, a tablet device, a personal digital assistant, and so on.

The computer storage medium stores computer programs therein. The computer programs, when run by the processor, execute the following steps of:

determining a movement state of the vehicle as a target movement state and broadcasting a target broadcast control channel signal; and initiating a monitoring apparatus of the vehicle to monitor an environment in which the vehicle is located after an access request reported by a mobile terminal on the basis of the target broadcast control channel signal is received.

In an exemplary embodiment, the computer programs, when run by the processor, further execute the following steps of:

acquiring, after a movement state of the vehicle is a target movement state, at least either of following pieces of information: a current location of the vehicle and a current time; and performing the step of broadcasting a target broadcast control channel signal when it is detected that the current time meets a preset time range; or performing the step of broadcasting a target broadcast control channel signal when it is detected that the current location meets a preset location condition; or performing the step of broadcasting a target broadcast control channel signal when it is detected that the current time meets a preset time range and the current location meets a preset location condition.

In an exemplary embodiment, the computer programs, when run by the processor, further execute the following steps of:

acquiring pieces of broadcast control channel information of all base stations corresponding to the current location of the vehicle after a movement state of the vehicle is a target movement state, the pieces of broadcast control channel information including at least a signal strength;

determining a target signal strength according to the pieces of broadcast control channel information; and broadcasting a target broadcast control channel signal having a signal strength greater than the target signal strength.

In an exemplary embodiment, the computer programs, when run by the processor, further execute the following step of:

selecting, according to signal strengths included in the pieces of broadcast control channel information, the strongest signal strength among the signal strengths as the target signal strength.

In an exemplary embodiment, the computer programs, when run by the processor, further execute the following step of:

determining a coverage scope of the target broadcast control channel signal according to a set distance between a transmitting antenna and a receiving antenna.

In an exemplary embodiment, the computer programs, when run by the processor, further execute the following steps of:

broadcasting a target broadcast control channel signal through the transmitting antenna, and acquiring a signal strength of the target broadcast control channel signal through the receiving antenna;

adjusting, when it is determined that the signal strength of the target broadcast control channel signal is less than the target signal strength, transmit power of the target broadcast control channel signal until the signal strength of the target broadcast control channel signal acquired by the receiving antenna is greater than the target signal strength, so that the signal strength of the target broadcast control channel signal is greater than the target signal strength in a coverage scope where the transmitting antenna is the circle center and the set distance is the radius.

In an exemplary embodiment, the computer programs, when run by the processor, further execute the following steps of:

acquiring an equipment identification number of the mobile terminal;

performing querying to a set database according to the equipment identification number of the mobile terminal so as to obtain a querying result, the database recording equipment identification numbers and corresponding time of reporting an access request; and determining whether an access request reported by the mobile terminal was received within a set time length before the current time according to the querying result, and if no, performing the step of initiating a monitoring apparatus of the vehicle to monitor an environment in which the vehicle is located.

In an exemplary embodiment, the computer programs, when run by the processor, further execute the following step of:

stopping broadcasting the target broadcast control channel signal.

In an exemplary embodiment, the computer programs, when run by the processor, further execute the following step of: initiating an automobile data recorder of the vehicle to record a video.

In an exemplary embodiment, the computer programs, when run by the processor, further execute the following steps of:

timing the recording of a video, and turning off the automobile data recorder of the vehicle when it is determined that the timed time length of the recording reaches a set time threshold.

In an exemplary embodiment, the computer programs, when run by the processor, further execute the following step of:

storing an equipment identification number of the mobile terminal in a manner of corresponding to the time of receiving the access request and the video respectively.

Figure 13:
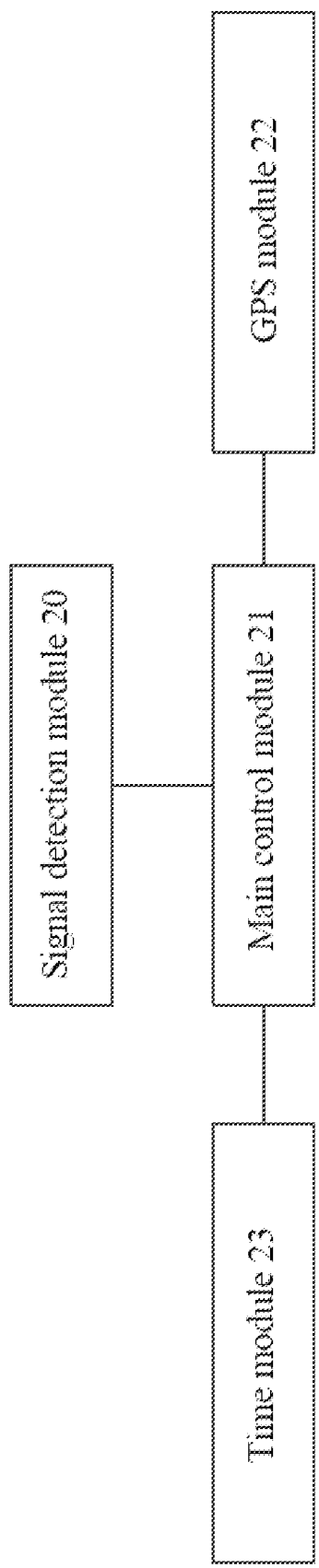
FIG. 13 schematically shows a structure of a monitoring device according to a specific embodiment of the present disclosure.

An embodiment of the present disclosure is elaborated below through a specific example. In this example, the vehicle includes a transmitting antenna and a receiving antenna which is disposed at a set distance away from the transmitting antenna, the monitoring apparatus is an automobile data recorder, the mobile terminal is a mobile phone, the device identification number is an international mobile user identification number, and the target movement state is a parking state. As shown in FIG. 13, the monitoring device provided in the present embodiment includes: a signal detection module 20, a main control module 21, GPS module 22, and a time module 23. Herein, the signal detection module 20 is required to be connected to the transmitting antenna and the receiving antenna of the vehicle, so as to acquire information of a mobile phone in a signal coverage scope through signaling interaction with the mobile phone. The main control module 21 is mainly used for the whole process control, which includes: turning on or off the signal detection module 20, acquiring information on a current location and information on a current time, initiating an automobile data recorder to operate in an emergency video-recording mode according to a result of the signal detection module 20, and so on. The GPS module 22 is used for detecting a current location of the vehicle and sending information on the current location to the main control module 21. The time module 23 is used for recording a current time and sending the current time information to the main control module 21.

The principle for the above monitoring device to perform monitoring is as follows.

First, the main control module 21 is configured to be in a power-on state. After the vehicle is stopped and the automobile data recorder is turned off, when the main control module 21 determines that a preset condition is met, for example, it is determined that the current location of the vehicle is in a suburb through the GPS module 22 or the current time is in a preset time period, the main control module 21 initiates the signal detection module 20. The signal detection module 20 obtains, by searching, broadcast control channel (BCCH) signals of a base station of the current location and adjacent base stations. Each of the BCCH signals includes a frequency and a location area code (LAC). After signal strengths of respective base stations are acquired according to the BCCH signals, the strongest signal strength (unit: dBm) is selected. Then, a frequency corresponding to the weakest signal strength (which indicates that a location of a base station is relatively far from the vehicle) is selected, and a BCCH signal having a signal strength greater than is broadcast continuously on the basis of the frequency. When a mobile phone enters a signal scope with a critical value, according to a protocol, the mobile phone sends a switching access request when there is a base station having a signal strength greater than the signal strength of the base station to which the mobile phone currently has access to. The signal detection module 20 directly confirms and gives permission to the access request, so that the mobile phone stays in a coverage scope of the BCCH signal. According to the protocol, the mobile phone reports its LAC and IMSI to the signal detection module 20. The signal detection module 20 reports this event to the main control module 21, and meanwhile stores the IMSI. After confirming that the mobile phone stays in the coverage scope of the BCCH signal, the main control module 21 initiates the automobile data recorder to operate in an emergency monitoring mode. A time length of emergency video-recording can be set according to needs of a user, such as one minute and so on. After initiating the automobile data recorder, the main control module 21 turns off the signal detection module 20, and the mobile phone automatically switches to another base station and is restored to a normal network mode.

When the time length of emergency video-recording meets a requirement, the main control module 21 controls the automobile data recorder to be turned off and operate in a vehicle-parked monitoring mode again, and controls the signal detection module 20 to be initiated again. For an IMSI that has been recorded, when an access request reported by a mobile phone corresponding to the IMSI is received later, the signal detection module rejects access of the mobile phone. This is because the purpose of monitoring has been achieved, and it is unnecessary to perform monitoring repeatedly.

Figure 14:
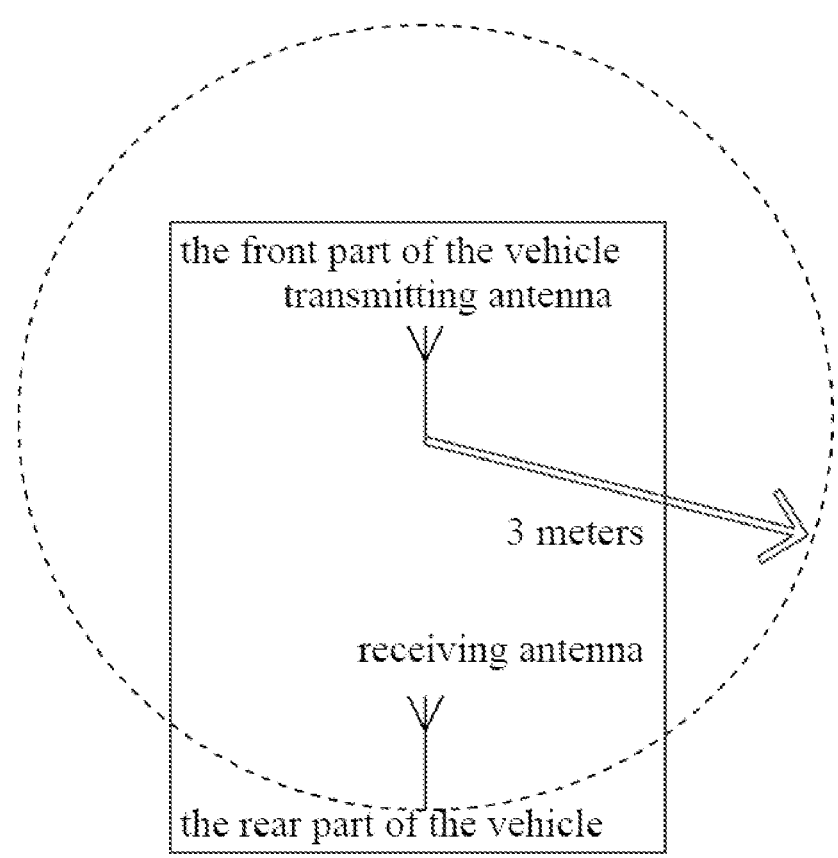
FIG. 14 schematically shows positions of a transmitting antenna and a receiving antenna according to a specific embodiment of the present disclosure.

Herein, in order to control a radiation scope of a signal, a double-antenna structure is designed. As shown in FIG. 14, an example is provided, in which a transmitting antenna disposed above the automobile data recorder at the front part of the vehicle and a receiving antenna disposed at the rear part of the vehicle are respectively included. For example, the distance between the transmitting antenna and the receiving antenna is three meters. The transmitting antenna is used for sending a BCCH signal, and the receiving antenna is used for receiving the BCCH signal. The receiving antenna first obtains, by searching, BCCH signals of a base station of the current location and adjacent base stations, and feeds back signal information (such as frequency, signal strength, and so on) to the signal detection module 20. The signal detection module 20 selects the strongest signal strength and then continuously broadcasts and sends a BCCH signal through the transmitting antenna at a certain transmit power value. At this time, the receiving antenna reports a signal strength of the BCCH signal received in real time, and the signal detection module 20 dynamically adjusts transmit power according to data reported, until a signal strength measured by the receiving antenna is. In this manner, a radiation circle with the transmitting antenna as the center, three meters as the radius, and as a critical value of the signal strength is formed, and the signal strength within this antenna radiation scope is greater than. According to the protocol, when the mobile phone enters this antenna radiation scope, switching is performed. In this way, the radiation scope can be controlled, and influence on an environment around the vehicle is reduced as much as possible.

Figure 15:
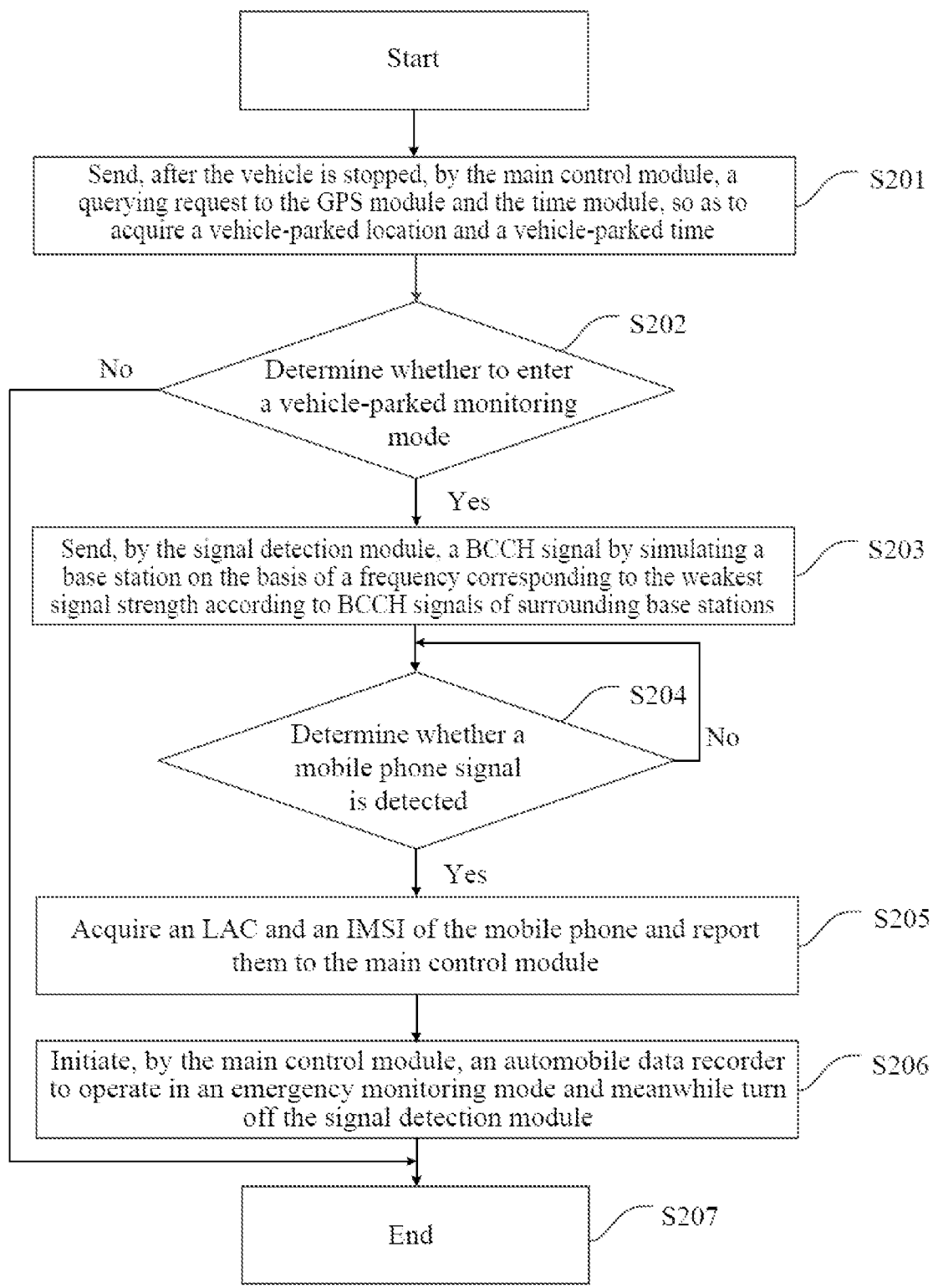
FIG. 15 schematically shows a flowchart of a monitoring method according to a specific embodiment of the present disclosure.

Based on the above monitoring device, a monitoring method according a specific embodiment of the present disclosure is shown in FIG. 15. The monitoring method includes the following steps.

At step S201, after the vehicle is stopped, the main control module sends a querying request to the GPS module and the time module, so as to acquire a vehicle-parked location and a vehicle-parked time.

Specifically, the main control module is configured to be in a power-on state. When the vehicle is stopped and the automobile data recorder is turned off, the main control module sends a querying request to the GPS module and the time module and receives information on a location returned by the GPS module on the basis of the querying request and information on the time returned by the time module on the basis of the querying request, so as to obtain the vehicle-parked location and the vehicle-parked time.

At step S202, it is determined whether to enter a vehicle-parked monitoring mode. If yes, step S203 is performed, and if no, step S207 is performed.

Herein, determining whether the current vehicle-parked location of the vehicle is in a preset regional scope and determining whether the current time is in a preset time range are performed. If the current vehicle-parked location of the vehicle is in the preset regional scope and the current time is in the preset time range, it is considered that the vehicle is easy to be damaged, and initiating the signal detection module to enter a vehicle-parked monitoring mode is performed. Otherwise, initiating the signal detection module to enter a vehicle-parked monitoring mode is not performed. The preset regional scope may be outside a main city area, and the preset time range may be from 11:00 PM to 6:00 AM.

At step S203, according to acquired BCCH signals of surrounding base stations, the signal detection module sends a BCCH signal by simulating a base station on the basis of a frequency corresponding to the weakest signal strength.

Herein, the signal detection module is connected to the transmitting antenna and the receiving antenna respectively, and may obtain, by searching, BCCH signals of a base station of the location of the vehicle and adjacent base stations, each of the BCCH signals including a frequency and a location area code. After signal strengths of respective base stations are acquired, the strongest signal strength is selected, and a BCCH signal is continuously broadcast and sent through the transmitting antenna at a certain transmit power value. At this time, the receiving antenna reports a signal strength of the BCCH signal received in real time, and the signal detection module 20 dynamically adjusts transmit power according to data reported, until a signal strength measured by the receiving antenna is. In this manner, a radiation circle with the transmitting antenna as the center, three meters as the radius, and as a critical value of the signal strength is formed, and a signal strength within this antenna radiation scope is greater than. According to the protocol, when entering this antenna radiation scope, the mobile phone sends an access request. In this way, the radiation scope can be controlled, and influence on an environment around the vehicle is reduced as much as possible.

At step S204, it is determined whether a mobile phone signal is detected. If yes, step S205 is performed, and if no, the process returns to the step S204.

Herein, when a person approaches the vehicle, a mobile phone carried by the person enters a coverage area of the BCCH signal sent by the transmitting antenna. Since the BCCH signal is strong, the mobile phone automatically switches to get access to the BCCH signal, i.e., automatically reports an access request. The determination as whether a mobile phone signal is detected is performed according to whether an access request is received.

At step S205, an LAC and an IMSI of the mobile phone are acquired and reported to the main control module.

Herein, the signal detection module directly gives permission to the access request after receiving the access request of the mobile phone, and the mobile phone stays in this system. According to a protocol, when arriving at a new location area, the mobile phone reports its LAC and IMSI to the signal detection module. The signal detection module treats the received access request as a triggering event and reports the triggering event and the IMSI information to the main control module.

At step S206, the main control module initiates an automobile data recorder to operate in an emergency monitoring mode and meanwhile turns off the signal detection module.

Herein, after receiving the triggering event and the IMSI information reported by the signal detection module, the main control module immediately initiates an automobile data recorder to operate in an emergency monitoring mode. The emergency monitoring mode may be recording a video for one minute. During this period, the main control module turns off the signal detection module, and the mobile which gets access is restored to the normal network mode.

It should be noted that, after the time length of emergency video-recording meets a requirement, the automobile data recorder is turned off, and the signal detection module is initiated again to enter a vehicle-parked monitoring mode.

At step S207, the process ends.

To sum up, the above embodiment provides a monitoring method which based on an automobile data recorder can continuously monitor illegal damages to the vehicle or objects around the vehicle under conditions that the vehicle is stopped and the automobile data recorder is turned off. In a first aspect, the monitoring method can solve a problem that a vehicle is damaged with slight momentum. In relevant monitoring methods, monitoring is performed based on a sensor, and it requires to give momentum to the vehicle so as to initiate monitoring. However, for events such as lightly opening a door of the vehicle, or disassembling some component of the vehicle such as a rear-view mirror, or slightly scratching the body of the vehicle, the momentum may not be sufficient to reach a threshold for initiating the sensor. In contrast, in the monitoring method based on an automobile data recorder provided in the present embodiment, monitoring may be initiated without touching the vehicle. In a second aspect, in relevant monitoring methods, monitoring is initiated after a damage event occurs. That is, a monitoring state is a post-event state. If the damage is only performed once, the damage process cannot be recorded. Moreover, in relevant monitoring methods, monitoring starts after the vehicle is damaged by contact. However, in the monitoring method provided in the present embodiment, monitoring starts from a moment when a person approaches the vehicle, so that the whole process of the damage event can be recorded, including the appearance of the person near the vehicle and so on. In a third aspect, the monitoring method provided in the present embodiment can play a role of assisting police surveillance. If a person commits an illegal and criminal activity near the vehicle, the automobile data recorder can perform monitoring.

The above description only involves specific embodiments of the present disclosure, but the protection scope of the present disclosure is not limited thereto. Any change or replacement that can be easily conceived of by any person skilled in the art within the technical scope disclosed in the present disclosure shall fall into the protection scope of the present disclosure. The protection scope of the present disclosure shall be determined by the protection scope as defined in the claims.

The invention claimed is:

1. A monitoring method applied to a vehicle, wherein the method comprises steps of:
   determining a movement state of the vehicle as a target movement state, and broadcasting a target broadcast control channel signal; and
   initiating, after receiving an access request reported by a mobile terminal on the basis of the target broadcast control channel signal, a monitoring apparatus of the vehicle to monitor an environment in which the vehicle is located.

2. The method according to claim 1, wherein the vehicle comprises a transmitting antenna and a receiving antenna which is disposed at a set distance away from the transmitting antenna, and wherein the transmitting antenna is used for broadcasting the target broadcast control channel signal and the receiving antenna is used for receiving the access request.

3. The method according to claim 2, wherein the step of broadcasting a target broadcast control channel signal comprises steps of:
   acquiring, after a movement state of the vehicle is the target movement state, pieces of broadcast control channel information of all base stations corresponding to a current location of the vehicle, the pieces of broadcast control channel information at least comprising a signal strength;
   determining a target signal strength according to the pieces of broadcast control channel information; and
   broadcasting the target broadcast control channel signal having a signal strength greater than the target signal strength.

4. The method according to claim 3, wherein the step of determining the target signal strength according to the pieces of broadcast control channel information comprises a step of:
   selecting, according to signal strengths included in the pieces of broadcast control channel information, the strongest signal strength among the signal strengths as the target signal strength.

5. The method according to claim 3, wherein after the step of broadcasting the target broadcast control channel signal having the signal strength greater than the target signal strength, the method further comprises a step of:
   determining a coverage scope of the target broadcast control channel signal according to the set distance between the transmitting antenna and the receiving antenna.

6. The method according to claim 5, wherein the step of determining the coverage scope of the target broadcast control channel signal according to the set distance between the transmitting antenna and the receiving antenna comprises steps of:
   broadcasting the target broadcast control channel signal through the transmitting antenna, and acquiring a signal strength of the target broadcast control channel signal through the receiving antenna;
   adjusting, when it is determined that the signal strength of the target broadcast control channel signal is less than the target signal strength, transmit power of the target broadcast control channel signal until the signal strength of the target broadcast control channel signal acquired by the receiving antenna is greater than the target signal strength, so that the signal strength of the target broadcast control channel signal is greater than the target signal strength in a coverage scope where the transmitting antenna is the circle center and the set distance is the radius.

7. The method according to claim 1, wherein before the step of broadcasting the target broadcast control channel signal, the method further comprises steps of:
   acquiring, after the movement state of the vehicle is the target movement state, at least either of following pieces of information: a current location of the vehicle and a current time; and
   performing the step of broadcasting the target broadcast control channel signal when it is detected that the current time meets a preset time range; or performing the step of broadcasting the target broadcast control channel signal when it is detected that the current location meets a preset location condition; or performing the step of broadcasting the target broadcast control channel signal when it is detected that the current time meets a preset time range and the current location meets a preset location condition.

8. The method according to claim 1, wherein before the step of initiating the monitoring apparatus of the vehicle to monitor the environment in which the vehicle is located, the method further comprises steps of:

acquiring an equipment identification number of the mobile terminal;

performing querying to a set database according to the equipment identification number of the mobile terminal so as to obtain a querying result, the database recording equipment identification numbers and corresponding time of reporting an access request; and determining, according to the querying result, whether an access request reported by the mobile terminal was received within a set time length before the current time, and if no, performing the step of initiating the monitoring apparatus of the vehicle to monitor the environment in which the vehicle is located.

9. The method according to claim 1, wherein after the step of initiating the monitoring apparatus of the vehicle to monitor the environment in which the vehicle is located, the method further comprises a step of:

stopping broadcasting the target broadcast control channel signal.

10. The method according to claim 1, wherein the step of initiating the monitoring apparatus of the vehicle to monitor the environment in which the vehicle is located comprises a step of:

initiating an automobile data recorder of the vehicle to record a video of the environment in which the vehicle is located.

11. The method according to claim 10, wherein after the step of initiating the automobile data recorder of the vehicle to record the video of the environment in which the vehicle is located, the method further comprises steps of:

timing the recording of the video, and turning off the automobile data recorder of the vehicle when it is determined that the timed time length of the recording reaches a set time threshold.

12. The method according to claim 11, wherein after the step of turning off the automobile data recorder of the vehicle, the method further comprises a step of:

storing an equipment identification number of the mobile terminal in a manner of corresponding to the time of receiving the access request and the video respectively.

13. A monitoring device, comprising: at least one monitoring apparatus, an antenna, a processor, and a memory for storing computer programs that can be run on the processor, wherein the monitoring apparatus and the antenna are respectively connected to the processor, and wherein the processor is used for, when running the computer programs, executing steps of the monitoring method according to claim 1, and wherein the antenna is used for broadcasting a target broadcast control channel signal according to a control instruction of the processor and the monitoring apparatus is used for performing monitoring according to an initiation instruction of the processor.

14. A non-transitory computer storage medium, wherein the non-transitory computer storage medium stores computer programs which, when executed by a processor, implement steps of the monitoring method according to claim 1.

* * * * *